(12) United States Patent
Takahashi et al.

(10) Patent No.: US 11,340,596 B2
(45) Date of Patent: May 24, 2022

(54) COUNTERMEASURE RECOMMENDATION DEVICE AND COUNTERMEASURE RECOMMENDATION METHOD

(71) Applicant: Hitachi, Ltd., Tokyo (JP)

(72) Inventors: Masakazu Takahashi, Tokyo (JP); Keiro Muro, Tokyo (JP)

(73) Assignee: HITACHI, LTD., Tokyo (JP)

(*) Notice: Subject to any disclaimer, the term of this patent is extended or adjusted under 35 U.S.C. 154(b) by 381 days.

(21) Appl. No.: 16/556,579

(22) Filed: Aug. 30, 2019

(65) Prior Publication Data

US 2020/0249661 A1  Aug. 6, 2020

(30) Foreign Application Priority Data

Feb. 5, 2019  (JP) .............................. JP2019-018454

(51) Int. Cl.
*G05B 19/418* (2006.01)
*G05B 23/02* (2006.01)

(52) U.S. Cl.
CPC ... *G05B 19/41875* (2013.01); *G05B 19/4188* (2013.01); *G05B 23/0294* (2013.01)

(58) Field of Classification Search
CPC .......... G05B 19/41875; G05B 19/4188; G05B 23/0294; G05B 2219/32192; Y02P 90/02
See application file for complete search history.

(56) References Cited

U.S. PATENT DOCUMENTS

| 2006/0259176 | A1 | 11/2006 | Fujii | |
| 2013/0212420 | A1* | 8/2013 | Lawson | G05B 19/4185 713/400 |
| 2016/0282854 | A1* | 9/2016 | Jauquet | G07C 9/28 |
| 2020/0058081 | A1* | 2/2020 | Saneyoshi | G06Q 50/04 |

FOREIGN PATENT DOCUMENTS

JP  4135726 B2  8/2008

* cited by examiner

*Primary Examiner* — Christopher E. Everett
(74) *Attorney, Agent, or Firm* — Baker Botts L.L.P.

(57) ABSTRACT

To optimize an operation of a manufacturing facility by presenting a countermeasure for improving quality, even in a manufacturing process where the product quality changes even under constant manufacturing conditions. A countermeasure recommendation device includes a data acquisition unit for collecting a plurality of pieces of facility data, and assigning a label for each process to each piece of the facility data; a countermeasure detection unit for creating countermeasure record data; a countermeasure recommendation unit for calculating the characteristic amount, extracting the characteristic amount, and selecting the countermeasure related to the extracted characteristic amount; and a countermeasure presentation unit for presenting the countermeasure in a visualized state.

15 Claims, 27 Drawing Sheets

FIG. 4

FACILITY DATA 1421

| MACHINING UNIT ID | TIME POINT | VOLTAGE | DISPLACEMENT AMOUNT | ... | PROCESS ID | VOLTAGE DIFFERENCE | DISPLACEMENT AMOUNT DIFFERENCE | ... |
|---|---|---|---|---|---|---|---|---|
| 2 | 9:18:10 | 2.0 | −0.4 | ... | P1 | | | ... |
| 2 | 9:18:12 | 2.1 | −0.6 | ... | P2 | −0.1 | 0.2 | ... |
| 1 | 9:18:20 | 2.0 | −0.4 | ... | P1 | | | ... |
| 1 | 9:18:22 | 2.1 | −0.6 | ... | P2 | −0.1 | 0.2 | ... |
| ... | ... | ... | ... | ... | ... | ... | ... | ... |

*FIG. 5*

MANUAL COUNTERMEASURE RECORD DATA 1422

| MACHINING UNIT ID | TIME POINT | COUNTERMEASURE TYPE | EXECUTION REASON |
|---|---|---|---|
| 2 | 8/1 9:18 | LINE CHECK | - |
| 2 | 8/3 7:51 | ELECTRODE REPLACEMENT | DEFECT OCCURRENCE |
| 1 | 8/4 2:44 | ELECTRODE REPLACEMENT | PERIODIC REPLACEMENT |
|  | ... |  | ... |

FIG. 6

COUNTERMEASURE RECORD DATA 1423

| MACHINING UNIT ID | TIME POINT | COUNTERMEASURE TYPE | MEAN VOLTAGE BEFORE COUNTERMEASURE | MEAN DISPLACEMENT AMOUNT BEFORE COUNTERMEASURE | PROCESS CAPABILITY BEFORE COUNTERMEASURE | ... | MEAN VOLTAGE AFTER COUNTERMEASURE | MEAN DISPLACEMENT AMOUNT AFTER COUNTERMEASURE | PROCESS CAPABILITY AFTER COUNTERMEASURE | ... |
|---|---|---|---|---|---|---|---|---|---|---|
| 2 | 8/1 9:18 | VOLTAGE CHANGE (1.9V) | 2.1 | -0.4 | 0.8 | ... | 1.9 | -0.3 | 1.1 | ... |
| 2 | 8/3 7:51 | VOLTAGE CHANGE (2.5V) | 2.3 | -0.6 | 0.9 | ... | 2.5 | -0.7 | 1.2 | ... |
| 1 | 8/4 2:44 | ELECTRODE REPLACEMENT | 2.4 | -0.4 | 0.7 | ... | 2.2 | -0.2 | 1.0 | ... |
| ... | ... | ... | ... | ... | ... | ... | ... | ... | ... | ... |

FIG. 7

RECOMMENDATION RECORD DATA 1424

| MACHINING UNIT ID | TIME POINT | COUNTERMEASURE TYPE | NUMBER OF SUCCESS CASE | NUMBER OF FAILURE CASE | SCORE (SUCCESS RATE) | REPRESENTATIVE SUCCESS CASE TIME POINT | ESTIMATED PROCESS CAPABILITY AFTER COUNTERMEASURE | RECOMMENDATION VIEW FLAG |
|---|---|---|---|---|---|---|---|---|
| 2 | 9/4 8:49 | VOLTAGE CHANGE (2.1V) | 3 | 1 | 75 | 8/1 9:18 | 1.1 | Y |
| 1 | 9/4 8:49 | VOLTAGE CHANGE (1.9V) | 4 | 1 | 80 | 8/3 10:18 | 1.3 | Y |
| 2 | 9/4 8:49 | ELECTRODE REPLACEMENT | 3 | 1 | 75 | 8/10 11:18 | 1.4 | N |
| 1 | 9/4 8:49 | VOLTAGE CHANGE (1.9V) | 4 | 4 | 50 | 8/13 10:18 | 1.3 | N |
| ... | ... | ... | ... | ... | ... | ... | ... | ... |

*FIG. 9*

COUNTERMEASURE INFORMATION DATA     1426

| MACHINING UNIT ID | COUNTERMEASURE TYPE | EXECUTION TIME | EXECUTION COST | AUTOMATIC DETECTION POSSIBILITY | AUTOMATIC DETECTION PG |
|---|---|---|---|---|---|
| 2 | VOLTAGE CHANGE | 30 | 100 | Y | volAdj |
| 2 | ELECTRODE REPLACEMENT | 180 | 500 | N | - |
| 1 | VOLTAGE CHANGE | 30 | 100 | N | - |
| ... | | ... | ... | ... | |

FIG. 10

QUALITY INFORMATION DATA  1427

| MACHINING UNIT ID | RANGE OF PROCESS CAPABILITY | DEFECTIVE RATE |
|---|---|---|
| 2 | - 1.0 | 0.010 |
| 2 | 1.0 – 1.2 | 0.005 |
| 2 | 1.2 – 1.4 | 0.002 |
| 2 | 1.4 - | 0.001 |
| 1 | - 1.0 | 0.020 |
| 1 | 1.0 – 1.2 | 0.012 |
| 1 | 1.2 – 1.4 | 0.008 |
| 1 | 1.4 - | 0.004 |
| ... | ... | ... |

FIG. 20

RECOMMENDATION RECORD DATA 1424

| MACHINING UNIT ID | TIME POINT | COUNTERMEASURE TYPE | NUMBER OF SUCCESS CASES | NUMBER OF FAILURE CASES | SUCCESS RATE | ESTIMATED PROCESS CAPABILITY AFTER COUNTERMEASURE | EFFECT [¥] | EXECUTION COST [¥] | SCORE [¥] (COST-EFFECT) | REPRESENTATIVE SUCCESS CASE TIME POINT | RECOMMENDATION VIEW FLAG |
|---|---|---|---|---|---|---|---|---|---|---|---|
| 2 | 9/4 8:49 | VOLTAGE CHANGE (2.1V) | 3 | 1 | 75% | 1.1 | 250 | 100 | 87.5 | 8/1 9:38 | Y |
| 1 | 9/4 8:49 | VOLTAGE CHANGE (1.9V) | 4 | 1 | 80% | 1.3 | 600 | 100 | 380 | 8/3 10:12 | Y |
| 2 | 9/4 8:49 | ELECTRODE REPLACEMENT | 3 | 1 | 75% | 1.4 | 400 | 500 | -200 | 8/10 11:54 | N |
| 1 | 9/4 8:49 | VOLTAGE CHANGE (1.7V) | 4 | 4 | 50% | 1.4 | 800 | 100 | 300 | 8/13 10:18 | N |
| ... | ... | ... | ... | ... | ... | ... | ... | ... | ... | ... | ... |

FIG. 22

FACILITY DATA                1421

| MACHINING UNIT ID | TIME POINT | VOLTAGE | DISPLACEMENT AMOUNT | ... | CHARACTERISTIC AMOUNT LABEL |
|---|---|---|---|---|---|
| 2 | 9:18:10 | 2.0 | -0.4 | | P1 |
| 2 | 9:18:12 | 2.1 | -0.6 | | P2 |
| 2 | 9:18:12 | -0.1 | 0.2 | | P1-P2 |
| 2 | 9:18:14 | 1.9 | -0.5 | | P3 |
| 2 | 9:18:14 | 0.2 | -0.1 | | P2-P3 |
| 2 | 9:18:14 | 0.08 | 0.08 | | Std(P1,P2,P3) |
| 2 | 9:18:24 | 2.0 | -0.4 | | P1 |
| ... | ... | ... | ... | ... | ... |

*FIG. 23*

FACILITY SETTING DATA 1425

| MACHINING UNIT ID | PROCESS ID | REQUIRED TIME | CHARACTERISTIC AMOUNT LABEL |
|---|---|---|---|
| 2 | P1 | $T_1$ (2s) | |
| 2 | P2 | $T_2$ (2s) | P1-P2 |
| 2 | P3 | $T_3$ (2s) | P2-P3 |
| 2 | P0 (PRODUCT SWITCHING) | $T_0$ (8s) | Std(P1,P2,P3) |

FIG. 24

RECOMMENDATION PARAMETER SETTING DATA  1428

| MACHINING UNIT ID | PROCESS ID | PARAMETER NAME | CHARACTERISTIC AMOUNT LABEL | CALCULATION METHOD |
|---|---|---|---|---|
| 2 | P1 | VOLTAGE | P1 | MEAN |
| 2 | P1 | DISPLACEMENT AMOUNT | P1 | MEAN |
| 2 | P1 | DISPLACEMENT AMOUNT | P1 | STANDARD DEVIATION |
| 2 | P1 | DISPLACEMENT AMOUNT | P1-P2 | MEAN |
| 2 | P1 | DISPLACEMENT AMOUNT | P1-P2 | STANDARD DEVIATION |
| 2 | P2 | VOLTAGE | P2 | MEAN |
| 2 | P2 | DISPLACEMENT AMOUNT | P2 | MEAN |
| 2 | P2 | DISPLACEMENT AMOUNT | P2 | STANDARD DEVIATION |
| 2 | P2 | DISPLACEMENT AMOUNT | Std(P1,P2,P3) | MEAN |
| 2 | P2 | DISPLACEMENT AMOUNT | Std(P1,P2,P3) | STANDARD DEVIATION |
| ... | ... | ... | ... | ... |

FIG. 27

FACILITY SETTING DATA 1425

| MACHINING UNIT ID | PROCESS ID | DETERMINATION CONDITION | CHARACTERISTIC PROCESS | CHARACTERISTIC AMOUNT LABEL |
|---|---|---|---|---|
| 1 | P1 | Time < 600 NUMBER OF ROTATION > 20 | N | Mean(B) |
| 1 | P2 | TEMPERATURE < 100 NUMBER OF ROTATION > 10 | Y | Mean(C) |
| 1 | P3 | TEMPERATURE < 200 NUMBER OF ROTATION > 10 | N | Mean(D), Min(D) |
| 1 | - | - | - | Mean(B)-Mean(C), Std(Mean(B), Mean(C)) |
| 2 | Q1 | Time = 8 | Y | - |
| 2 | Q2 | Time = 2 | N | Mean(G) |
| 2 | Q3 | Time = 2 | N | Mean(H) |
| 2 | Q4 | Time = 2 | N | Mean(I) |
| 2 | - | - | - | Std(Mean(G), Mean(H), Mean(I)) |

COUNTERMEASURE RECOMMENDATION DEVICE AND COUNTERMEASURE RECOMMENDATION METHOD

CLAIM OF PRIORITY

The present application claims priority to Japanese Patent Application No. 2019-018454 filed on Feb. 5, 2019, the content of which is hereby incorporated by reference into this application.

BACKGROUND OF THE INVENTION

1. Field of the Invention

The present invention relates to a countermeasure recommendation device and a countermeasure recommendation method.

2. Description of the Related Art

Due to the improvement in sensing technique and computing performance, the use of information technique in the manufacturing industry accelerates worldwide. Actually, there is a growing effort to improve sales and productivity by analyzing various data related to product, facility, operator, and the like.

One of the use examples of the information technique in the manufacturing industry is to determine an optimum manufacturing condition. The manufacturing condition includes conditions determined in a design stage of the product and conditions to be changed in order to take countermeasures against degradation of the product quality being manufactured. Generally, with respect to the latter countermeasure, all data related to the product, facility, and operator during manufacture is analyzed to find the reason for quality degradation and determine which countermeasure to be executed is effective.

Japanese Patent No. 4135726 (Patent Literature 1) discloses a technique for implementing a manufacturing condition setting system which includes: a manufacturing state collection unit configured to input a static/dynamic condition and a product quality when the static/dynamic condition does not change to a predetermined number of manufactured products or more under a normal manufacturing state, together with search information; a dynamic condition inference unit configured to estimate and output an optimal dynamic condition when a combination of static conditions has already been experienced; and a dynamic condition correction unit configured to correct inference knowledge stored in the dynamic condition inference unit if necessary, using information input from the manufacturing state collection unit.

Patent Literature 1 describes a method of analogizing a dynamic condition of a manufacturing facility from a similar case, and selecting a condition with high quality when a plurality of dynamic conditions are present under one static condition. However, even when the produced is manufactured in a state where the dynamic condition of the manufacturing facility is in a constant state, the method of Patent Literature 1 cannot be applied, for example, when the product quality is changed due to differences between lots for the same type of material or degradation of a facility component.

SUMMARY OF THE INVENTION

The invention is made in view of the above problems, and an object of the invention is to provide a countermeasure recommendation device and a countermeasure recommendation method which can optimize the operation of the manufacturing facility by presenting a countermeasure for improving the quality, even in a manufacturing process where the product quality changes even under constant manufacturing conditions.

In order to solve the above problems, a countermeasure recommendation device according to one aspect of the invention includes: a data acquisition unit configured to collect a plurality of pieces of facility data from a manufacturing facility, and to assign a label for each process to each piece of the facility data based on facility setting data; a countermeasure detection unit configured to, based on the facility data, create countermeasure record data including a type of a countermeasure performed on the manufacturing facility and a characteristic amount indicating an effect of the countermeasure; a countermeasure recommendation unit configured to calculate the characteristic amount from a predetermined number of latest facility data, extract the characteristic amount of the countermeasure record data similar to the calculated characteristic amount, and select the countermeasure related to the extracted characteristic amount; and a countermeasure presentation unit configured to present the countermeasure selected by the countermeasure recommendation unit in a visualized state.

According to the invention, it is possible to optimize the operation of the manufacturing facility by presenting the countermeasure for improving the quality.

BRIEF DESCRIPTION OF THE DRAWINGS

FIG. 4 is a diagram showing an example of facility data according to the first embodiment.

FIG. 5 is a diagram showing an example of manual countermeasure record data according to the first embodiment.

FIG. 6 is a diagram showing an example of countermeasure record data according to the first embodiment.

FIG. 7 is a diagram showing an example of recommendation record data according to the first embodiment.

FIG. 9 is a diagram showing an example of countermeasure information data according to the first embodiment.

FIG. 10 is a diagram showing an example of quality information data according to the first embodiment.

FIG. 20 is a diagram showing an example of recommendation record data according to a second embodiment.

FIG. 22 is a diagram showing an example of facility data according to the third embodiment.

FIG. 23 is a diagram showing an example of facility setting data according to the third embodiment.

FIG. 24 is a diagram showing an example of recommendation parameter setting data according to the third embodiment.

FIG. 27 is a diagram showing an example of facility setting data according to a fourth embodiment.

DESCRIPTION OF THE PREFERRED EMBODIMENTS

Embodiments of the invention will be described below with reference to the drawings. The embodiments described below do not limit the invention according to the claims, and all of the elements described in the embodiments and the combinations of the elements are not necessarily essential to the solving means of the invention.

A countermeasure recommendation device according to the embodiment selects a countermeasure based on facility data collected from a manufacturing facility (hereinafter, simply referred to as "facility"), and presents the selected countermeasure in a visualized state. Depending on the type of the facility, the same type of facility data may be collected from the facility even in different processes.

In the following embodiments, a case where the facility is an automatic welding machine will be described as an example. The automatic welding machine to which the embodiment is applied performs welding using the same machining unit for a plurality of portions of the product. It is an example of a process in the description to perform welding using the machining unit for each welding portion. The process executed by the facility, including the automatic welder, is certainly not limited to this example. A specific example of the facility is not limited to the automatic welding machine, and may be a known facility such as an automatic assembling device.

Along with the welding operation, the countermeasure recommendation device collects the facility data from the automatic welding machine. Although details will be described later, examples of facility data which can be collected from the automatic welding machine include a voltage value applied to the machining unit when welding a predetermined portion of the product, and a difference between thicknesses of the product before and after welding (hereinafter, the value is referred to as "displacement amount"). The facility data is output from the automatic welding machine each time point when the machining unit executes a process.

The facility data is important for grasping the quality of the actual welding portion and controlling the product quality. However, in the case of the automatic welding machine described above, since data of the same format is output even when the process is different, it is difficult to perform quality control in a process unit based on the facility data output from the automatic welding machine. In the countermeasure recommendation device according to the embodiment, attention is paid to the problem described above, and the label for each process is assigned to the facility data to enable the quality control in a process unit.

When "data" is described in the description, the number thereof is not limited to this. There is no limitation on the format of the data. Further, data saved and stored in a storage medium in a so-called table format is also referred to as "data" herein.

First Embodiment

Schematic Configuration of Manufacturing System

Figure 1:
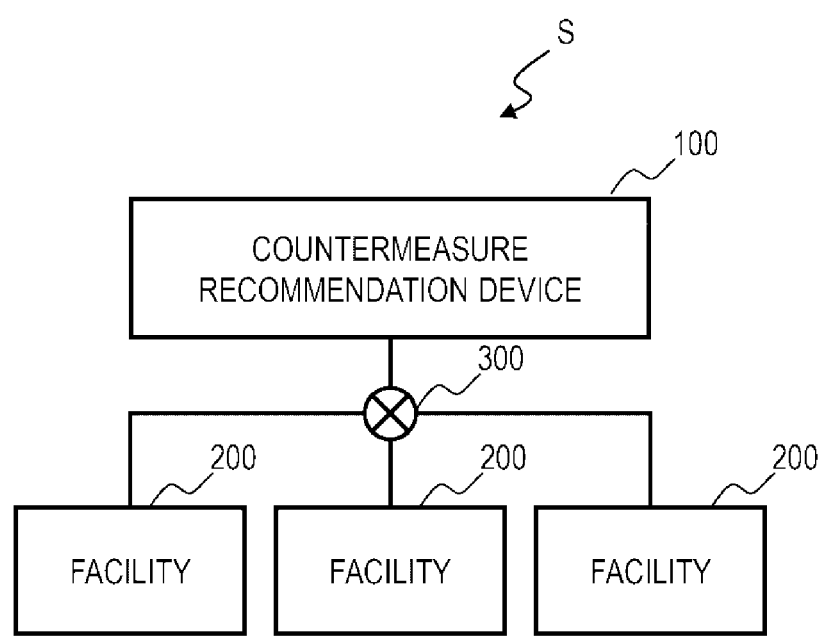
FIG. 1 is a block diagram showing a manufacturing system according to a first embodiment.

FIG. 1 is a block diagram showing a manufacturing system according to a first embodiment. A manufacturing system S according to the present embodiment includes a countermeasure recommendation device 100 and a facility 200 according to the first embodiment. The countermeasure recommendation device 100 communicates with one or more facilities 200 via a communication network 300. Although the manufacturing system S includes three facilities 200 in FIG. 1, the number of the facility 200 communicating with the countermeasure recommendation device 100 is not limited.

Figure 2:
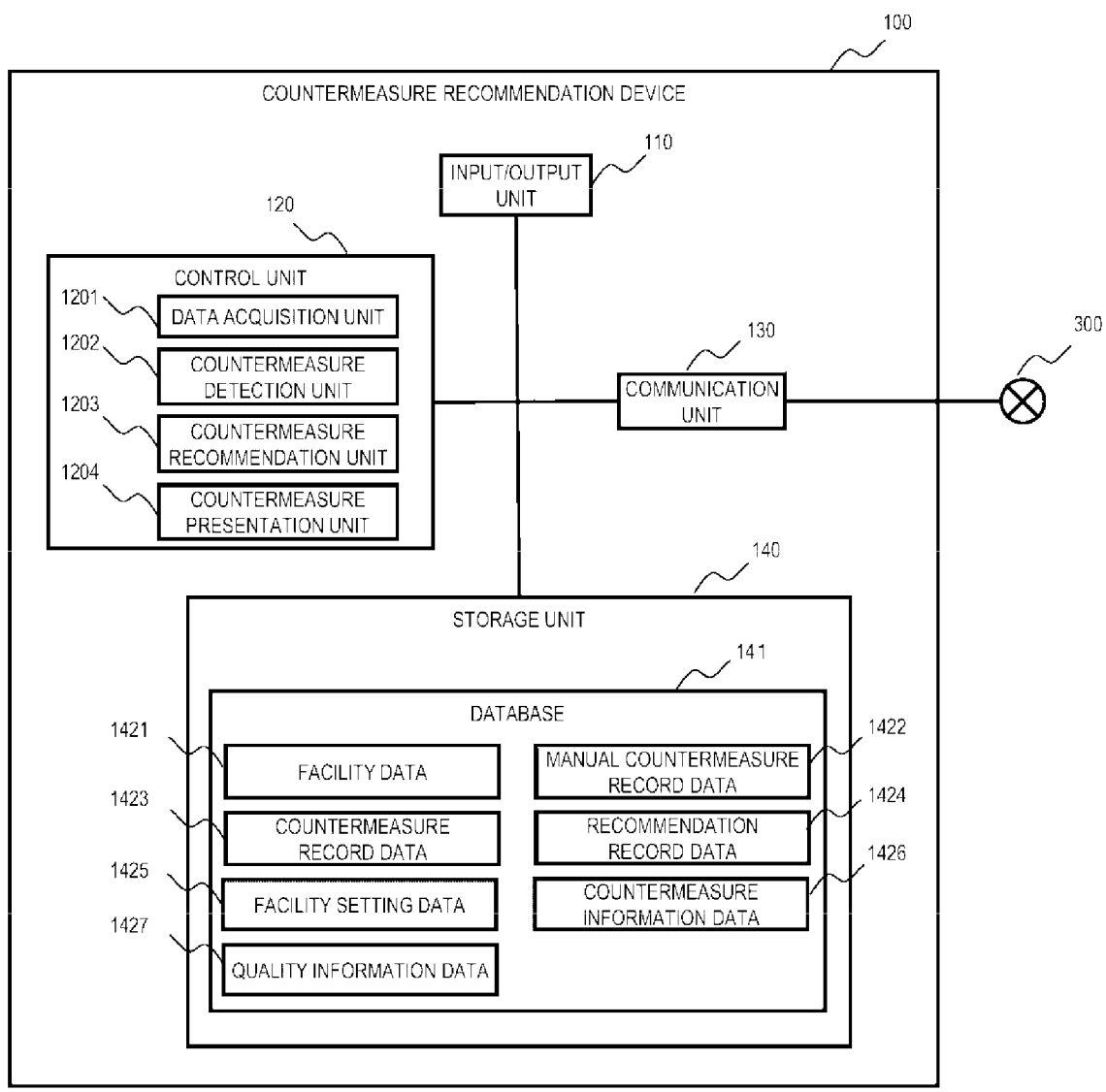
FIG. 2 is a block diagram showing a countermeasure recommendation device according to the first embodiment.

FIG. 2 is a block diagram showing the countermeasure recommendation device 100 according to the first embodiment.

The countermeasure recommendation device 100 includes an input/output unit 110, a control unit 120, a communication unit 130, and a storage unit 140. The countermeasure recommendation device 100 preferably includes a device capable of performing various types of information processing. As an example, the countermeasure recommendation device 100 includes a computer or the like.

The input/output unit 110, which is an example of an input unit, receives input/output from a user of the countermeasure recommendation device 100. The input/output unit 110 includes, for example, a combination of an input device such as a keyboard and a mouse and an output device including a display screen such as a liquid crystal display. Alternatively, the input/output unit 110 includes a device capable of performing input/output by a single device such as a smart phone or a tablet device.

For example, the input/output unit 110 receives an input of information necessary for creating or changing data recorded in the storage unit 140, and outputs completion of the creation or change and a countermeasure recommendation result to the display screen. The input/output processing executed by the input/output unit 110 may be executed by an input/output unit installed in another device via the communication unit 130.

In particular, the input/output unit 110 is configured to receive manual countermeasure record data including a type of a countermeasure performed on a facility and a time point at which the countermeasure is performed. The manual countermeasure record data received by the input/output unit 110 is stored in the storage unit 140.

The control unit 120 executes a program stored in the storage unit 140. The control unit 120 includes, for example, an arithmetic element such as a central processing unit (CPU) capable of performing various types of information processing. For example, the control unit 120 executes a processing of storing data acquired from the input/output unit 110 into the storage unit 140, processing the data stored in the storage unit 140 and storing the result into the storage unit 140, outputting data stored in the storage unit 140 to the input/output unit 110 or the communication unit 130, or the like.

The storage unit 140, which will be described later, stores a program (not shown) such as firmware. When the countermeasure recommendation device 100 is powered on, the control unit 120 reads and executes the firmware and the like stored in the storage unit 140, performs overall operation control over the countermeasure recommendation device 100, and executes functions shown in each functional unit to be described later.

The control unit 120 includes a data acquisition unit 1201, a countermeasure detection unit 1202, a countermeasure recommendation unit 1203, and a countermeasure presentation unit 1204.

The data acquisition unit 1201 is configured to collect a plurality of pieces of facility data from the facility 200, and to assign a label for each process to each piece of the facility data based on facility setting data. In other words, the data acquisition unit 1201 acquires a plurality of pieces of facility data from the facility 200, adds an ID for each process, and executes a processing of storing data into a database 141.

Here, the data acquisition unit 1201 creates additional facility data from the facility data for each process.

The countermeasure detection unit 1202 executes a processing of detecting the countermeasure from data stored in the database 141. More specifically, the countermeasure detection unit 1202 is configured to, based on the facility data acquired by the data acquisition unit 1201, create countermeasure record data including a type of a countermeasure performed on the facility 200 and a characteristic amount indicating the effect of the countermeasure.

Here, the countermeasure detection unit 1202 refers to the countermeasure record data based on the time point of the manual countermeasure record data, corrects the time point of the manual countermeasure record data based on the time point of the countermeasure record data, and records the corrected time point and the type of the countermeasure of the manual countermeasure record data into the countermeasure record data.

In addition, the countermeasure detection unit 1202 refers to the facility setting data, calculates the characteristic amount corresponding to the type of the countermeasure of the manual countermeasure record data, and records the characteristic amount into the countermeasure record data.

Further, when there is a plurality of countermeasures at the same time point, the countermeasure detection unit 1202 summarizes the countermeasures as a single composite countermeasure.

The countermeasure recommendation unit 1203 executes a processing of outputting a countermeasure recommendation result based on the data stored in the database 141. More specifically, the countermeasure recommendation unit 1203 is configured to calculate a characteristic amount from a predetermined number of latest facility data, extract a characteristic amount of the countermeasure record data similar to the calculated characteristic amount, and select the countermeasure related to the extracted characteristic amount.

Here, the countermeasure recommendation unit 1203 extracts the characteristic amount of the countermeasure record data having a value in a predetermined range with respect to a value of the characteristic amount calculated based on the facility data. In addition, the countermeasure recommendation unit 1203 temporarily selects a plurality of countermeasures, and selects one of the temporarily selected countermeasures based on a predetermined criterion. Further, the countermeasure recommendation unit 1203 calculates a score for each of the temporarily selected plurality of the countermeasures, and selects a countermeasure having the highest score.

The countermeasure presentation unit 1204 is configured to present the countermeasure selected by the countermeasure recommendation unit 1203 in a visualized state. More specifically, the countermeasure presentation unit 1204 displays the data stored in the database 141, and executes a processing of creating a screen for receiving the input of countermeasure record.

The details of the processing executed by each functional unit shown in FIG. 2 will be described later.

The communication unit 130 is for the countermeasure recommendation device 100 to communicate with the facility 200 via the communication network 300. The communication unit 130 performs communication according to The Institute of Electrical and Electronics Engineers, Inc. (IEEE) 802.3 standard when the communication network 300 is a wired LAN, and performs communication according to IEEE 802.11 standard when the communication network 300 is a wireless LAN. Examples of such a device include a router or an access point device.

For example, the communication unit 130 executes communication for storing data and events acquired from the facility 200 into the countermeasure recommendation device 100. For another example, the communication unit 130 executes communication for transmitting a recommendation result to the facility 200.

The storage unit 140 stores data and programs. The storage unit 140 includes, for example, a magnetic storage medium such as a hard disk drive (HDD), and a semiconductor storage medium such as a random access memory (RAM), a read only memory (ROM), and a solid state drive (SSD). A combination of an optical disk such as a digital versatile disk (DVD) and an optical disk drive is also used as the storage unit 140. In addition, a known storage medium such as a magnetic tape medium is also used as the storage unit 140.

The database 141 is stored in the storage unit 140. The database 141 stores facility data 1421, manual countermeasure record data 1422, countermeasure record data 1423, recommendation record data 1424, facility setting data 1425, countermeasure information data 1426, and quality information data 1427. Details of the various types of data stored in the database 141 will be described later.

Figure 3:
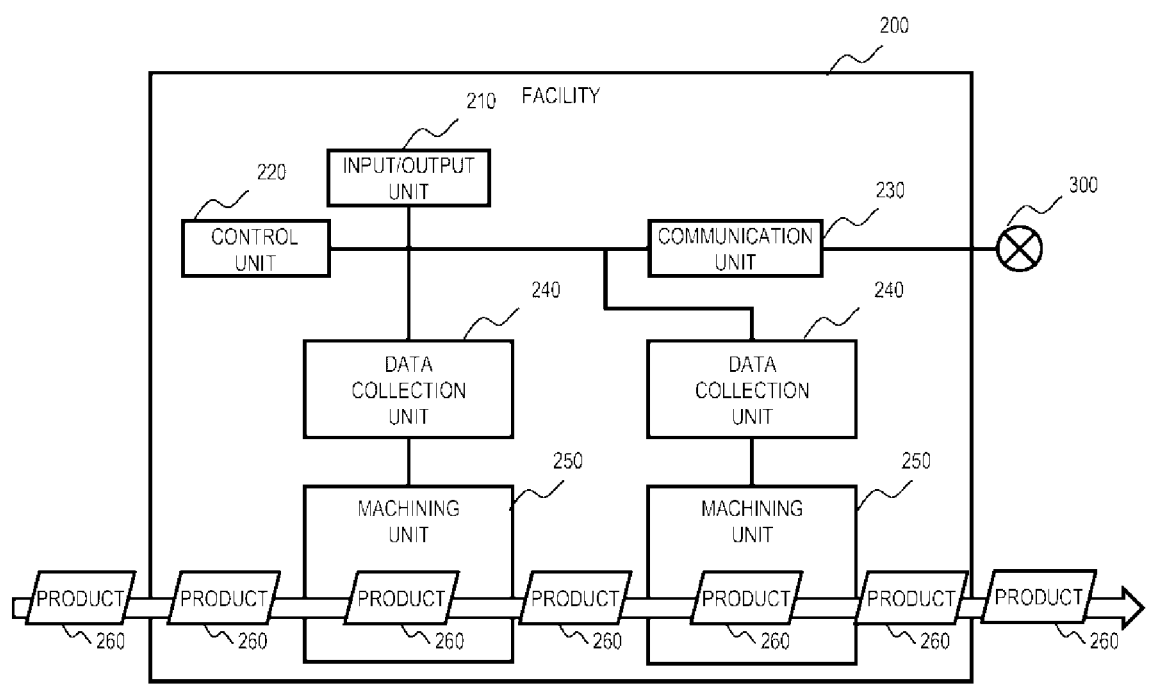
FIG. 3 is a block diagram showing a facility which constitutes the manufacturing system according to the first embodiment.

FIG. 3 is a block diagram showing the facility 200 which constitutes the manufacturing system S according to the first embodiment.

The facility 200 includes an input/output unit 210, a control unit 220, a communication unit 230, a data collection unit 240, and a machining unit 250. A product 260 input to the facility 200 is machined by one or more machining units 250 and the machined product is output.

The input/output unit 210 is a device which receives input/output from the user. For example, the input/output unit 210 is a device which inputs set information to the control unit 220 and inputs a setting related to data collection to the data collection unit 240.

The control unit 220 is a device which controls the facility 200. For example, the control unit 220 is a device which controls each machining unit to perform a predetermined operation, or controls each machining unit to stop the facility 200 when a predetermined operation occurs.

The communication unit 230 is a device for the control unit 220 and the data collection unit 240 to communicate with the countermeasure recommendation device 100 via the network 300.

The data collection unit 240 is a device which collects the facility data from the machining unit 250 and sends the collected facility data to the countermeasure recommendation device 100 via the communication unit 230.

The machining unit 250 is a device which executes a predetermined machining on the product 260 input to the facility 200. For example, when the facility 200 is the automatic welding machine, the machining unit 250 is a welding unit and a positioning unit, or when the facility 200 is an automatic assembling device, the machining unit 250 is a mounting unit or a soldering unit of components. In the present embodiment, the facility 200 includes two machining units 250.

Various Types of Data Stored in Database 141

FIG. 4 is a diagram showing an example of the facility data 1421 according to the first embodiment. The facility data 1421 is collected by the data collection unit 240 of the facility 200, is sent to the countermeasure recommendation device 100 via the communication unit 130, the communication unit 230 or the communication network 300, and is stored in the storage unit 140.

In the facility data 1421, a machining unit ID, a time point, a voltage, a displacement amount, a process ID, a voltage difference between processes, and a displacement amount difference between processes are stored. Although FIG. 4 shows an example in which data such as the voltage and the displacement amount from the facility 200 can be acquired, the data stored in the facility data 1421 is not limited to the voltage and the displacement amount.

The machining unit ID is an ID for identifying each machining unit 250 of the facility 200.

In the example of FIG. 4, "P1" and "P2" are stored as the process ID. The process ID is an example of a label for each process assigned by the data acquisition unit 1201. In the present embodiment, it is assumed that the machining unit 250 executes two processes. The number and the type of processes are certainly not limited.

The voltage difference between the processes and the displacement amount difference between the processes are examples of the additional facility data created based on the collected facility data after the data acquisition unit 1201 collects the facility data (machining unit ID, time point, voltage, and displacement amount in the example of FIG. 4) from the data collection unit 240 of the facility 200. In the following description, unless otherwise specified, the facility data collected from the data collection unit 240, the process ID labeled by the data acquisition unit 1201, and the additional facility data are referred to as the "facility data".

FIG. 5 is a diagram showing an example of the manual countermeasure record data 1422 according to the first embodiment. In a screen display processing operation S400 described later, when a facility operator manually performs a countermeasure on the facility 200, the manual countermeasure record data 1422 is stored into the storage unit 140 of the countermeasure recommendation device 100 by the facility operator inputting data via the input/output unit 110 of the countermeasure recommendation device 100.

In the manual countermeasure record data 1422, the machining unit ID, the time point, a countermeasure type, and an execution reason are stored. In the example of FIG. 5, "electrode replacement" or "line check" is stored as the countermeasure type, and "defect occurrence" or "periodic replacement" is stored as the execution reason. There may be no data for the execution reason.

FIG. 6 is a diagram showing an example of the countermeasure record data 1423 stored in the database 141 according to the first embodiment. The countermeasure record data 1423 is created by the countermeasure detection unit 1202 based on the facility data 1421 and is stored in the storage unit 140.

In the countermeasure record data 1423, the machining unit ID, the time point, the countermeasure type, a mean voltage before countermeasure, a mean displacement amount before countermeasure, process capability before countermeasure, a mean voltage after countermeasure, a mean displacement amount after countermeasure, and process capability after countermeasure are stored. Among the countermeasure record data 1423, values other than the machining unit ID, the time point, and the countermeasure type, for example, the mean voltage, the mean displacement amount, and the process capability are characteristic amounts which indicate the effects of the countermeasure. It is necessary to have the same type of characteristic amount both before and after the countermeasure, but the characteristic amount is not limited to the mean voltage, the mean displacement amount, and the process capability. Only the mean voltage, the mean displacement amount, and the process capability are taken as the characteristic amount in the relationship shown in FIG. 6, but in addition to the mean voltage, the mean displacement amount, and the process capability, a standard deviation of the displacement amount obtained by performing comparison in a countermeasure recommendation processing operation shown in FIG. 16 to be described later is also included. Further, these characteristic amounts are calculated not only before and after the countermeasure but also calculated as values for individual processes (P1 and P2), for all the processes, and for the difference between the processes. In addition, the characteristic amount is not limited to those illustrated.

Here, the process capability refers to process capability related to the quality in the field of quality control. In the description, a process capability index $c_{pk}$ shown in the following formula is used as a value indicating the process capability.

$$C_{pk} = \min\left[\frac{USL - \hat{\mu}}{3 \times \hat{\sigma}}, \frac{\hat{\mu} - LSL}{3 \times \hat{\sigma}}\right] \quad \text{(Formula 1)}$$

Here,
USL: upper standard value
LSL: lower standard value
$\hat{\mu}$: estimate value of population mean
$\hat{\sigma}$: estimate value of population standard deviation FIG. 7 is a diagram showing an example of the recommendation record data 1424 according to the first embodiment. The recommendation record data 1424 is created by the countermeasure recommendation unit 1203 when the countermeasure recommendation unit 1203 performs the countermeasure recommendation operation.

In the recommendation record data 1424, the machining unit ID, the time point, the countermeasure type, the number of success case, the number of failure case, a score, a representative success case time point, an estimated process capability after countermeasure, and a recommendation view flag are stored. In the example shown in FIG. 7, since "voltage change" or "electrode replacement" is stored as the countermeasure type, and the voltage change is a countermeasure for changing a set value, the changed set value is also recorded according to the countermeasure type.

The score is a value indicating a success rate calculated by "number of success case/(number of success case+number of failure case)". The score is not limited to the success rate, and, for example, the estimated process capability after countermeasure may be set as the score. The representative success case time point may be, for example, the time point of the latest success case, or the time point of the success case with the highest score in the past. The recommendation view flag indicates whether a recommendation is viewed on a screen of the input/output unit 110, and "Y" is stored when the recommendation is viewed, and "N" is stored when the recommendation is not viewed.

Figure 8:
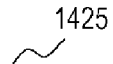
FIG. 8 is a diagram showing an example of facility setting data according to the first embodiment.

FIG. 8 is a diagram showing an example of the facility setting data 1425 according to the first embodiment. The facility setting data 1425 is acquired from the control unit 220 of the facility 200 in a data acquisition processing operation performed by the data acquisition unit 1201 and is stored in the storage unit 140.

The facility setting data 1425 stores the machining unit ID, the process ID, and a required time point for each process.

FIG. 9 is a diagram showing an example of the countermeasure information data 1426 according to the first embodiment. The countermeasure information data 1426 is also created by the countermeasure recommendation unit 1203 when the countermeasure recommendation unit 1203 performs the countermeasure recommendation operation.

In the countermeasure information data 1426, the machining unit ID, the countermeasure type, an execution time, an execution cost, an automatic detection possibility, and a path in the storage unit 140 in which an automatic detection program (PG) is stored are stored. In the example of FIG. 9, the execution time is the time required to execute the countermeasure, and the execution cost is the sum of the manufacturing cost occurred when the facility stops due to the execution of the countermeasure and the cost of components used. In the automatic detection possibility, "Y" is stored when the automatic detection is possible, and "N" is stored when the automatic detection is not possible.

FIG. 10 is a diagram showing an example of the quality information data 1427 according to the first embodiment. The quality information data 1427 is created by, for example, the administrator of the countermeasure recommendation device 100 and is stored in the storage unit 140.

In the quality information data 1427, the machining unit ID, a range of the process capability, and a defective rate are stored. In the example of FIG. 10, the defective rate corresponding to the range of the process capability can be calculated for each machining unit ID. For example, when the machining unit ID is 4 and the process capability is 1.1, the defective rate is 0.010. In another example of the quality information data 1427, a function for outputting the defective rate using the process capability as an input is stored for each machining unit ID.

Operation of Countermeasure Recommendation Device 100

The operation of the countermeasure recommendation device 100 according to the first embodiment will be described below with reference to the flowcharts of FIGS. 11, 12, 14, 16 and 17, and FIGS. 13 and 15. In the following description, it is assumed that the countermeasure recommendation device 100 collects a substantial number (at least 50) of pieces of facility data 1421 from the facility 200 and repeatedly executes the operation shown in FIG. 11.

Figure 11:
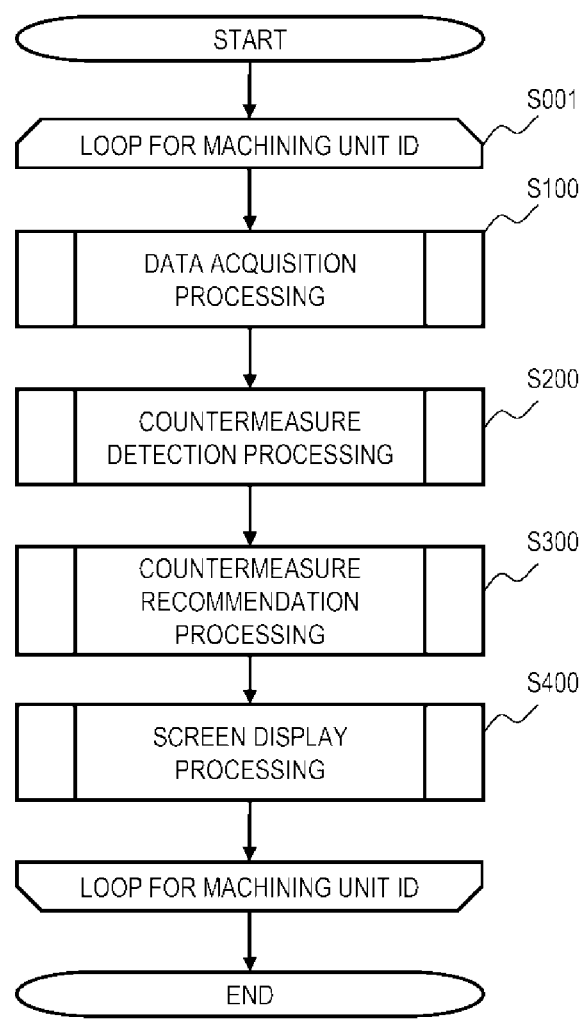
FIG. 11 is a flowchart showing an overall operation of the countermeasure recommendation device according to the first embodiment.

FIG. 11 is a flowchart showing an overall operation of the countermeasure recommendation device 100 according to the first embodiment.

First, the control unit 120 repeatedly executes the processing of steps S100 to S400 for all the machining units 250 (step S001). That is, the data acquisition unit 1201 of the control unit 120 executes a data acquisition processing operation (step S100). Next, the countermeasure detection unit 1202 of the control unit 120 executes a countermeasure detection processing operation (step S200). Next, the countermeasure recommendation unit 1203 of the control unit 120 executes a countermeasure recommendation processing operation (step S300). Then, the countermeasure presentation unit 1204 of the control unit 120 executes a screen display processing operation (step S400). The control unit 120 repeatedly executes the above processing at a constant interval, for example, every one minute.

A flowchart shows the data acquisition processing according to first embodiment.

Figure 12:
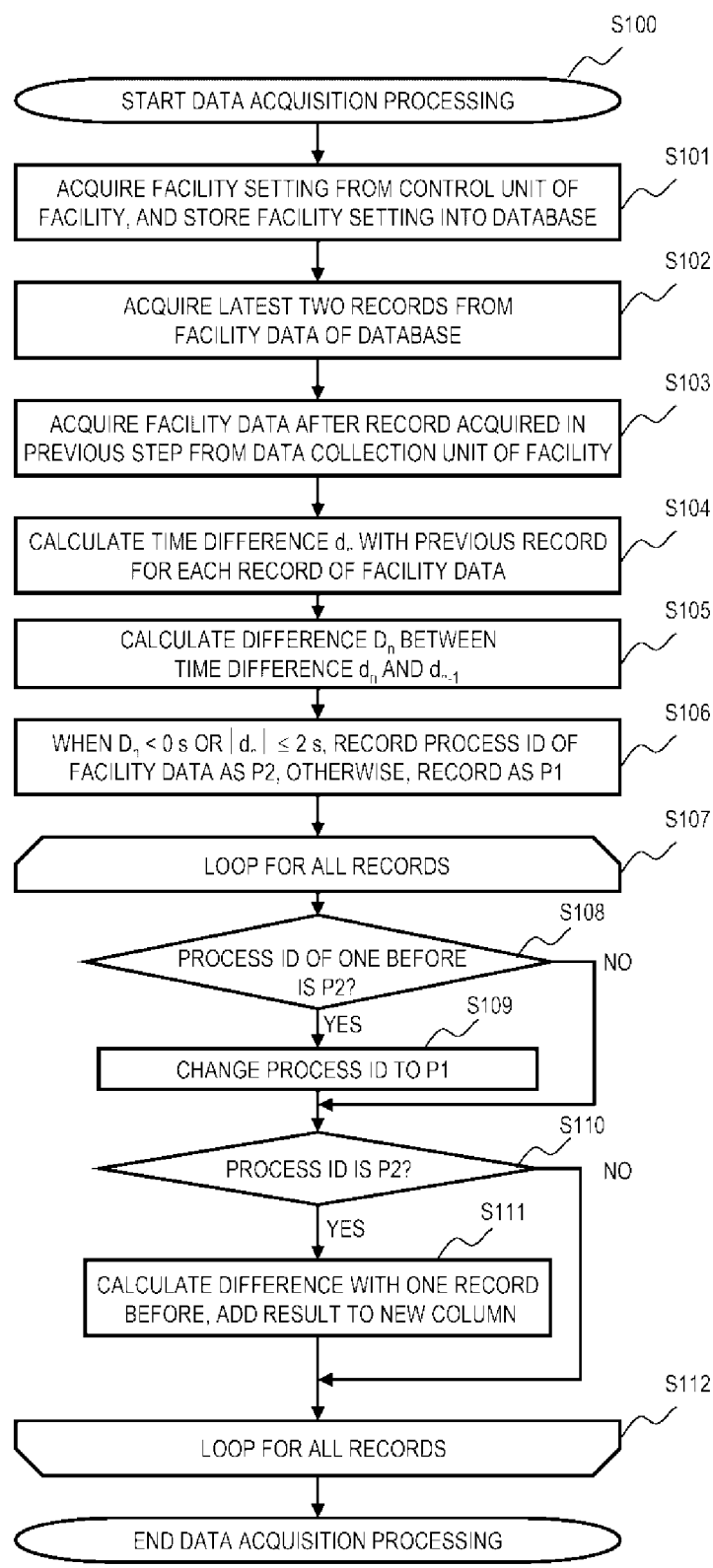
FIG. 12 is a flowchart showing a data acquisition processing performed by the countermeasure recommendation device according to the first embodiment.

FIG. 12 is a flowchart showing the data acquisition processing operation S100 performed by the countermeasure recommendation device 100 according to the first embodiment.

First, the data acquisition unit 1201 acquires facility setting from the control unit 220 of the facility 200 and stores the facility setting into the facility setting data 1425 of the database 141 (step S101).

Next, the data acquisition unit 1201 acquires the latest two records from the facility data 1421 of the database 141 (step S102).

Next, the data acquisition unit 1201 acquires the facility data after the record acquired in step S102 from the data collection unit 240 of the facility 200 (step S103).

Next, for each record of the facility data acquired in step S103, the data acquisition unit 1201 calculates a time difference $d_n$ between the acquired record and a previous record thereof (step S104).

Next, with respect to the time difference $d_n$ calculated in step S104, the data acquisition unit 1201 calculates a difference $D_n$ between the time difference $d_n$ and a time difference $d_{n-1}$ which is a time difference between the previous record and a next previous record thereof (step S105).

Next, when the $D_n$ is smaller than 0 second or an absolute value of $d_n$ is equal to or less than 2 seconds, the data acquisition unit 1201 records the process ID of the facility data 1421 as P2, and otherwise, records the process ID of the facility data 1421 as P1 (step S106).

Next, the data acquisition unit 1201 repeatedly executes the processing of steps S107 to S112 for all the records (step S107).

That is, the data acquisition unit 1201 determines whether the process ID of one record before is P2 (step S108). When the data acquisition unit 1201 determines that the process ID of one record before is P2 (YES in step S108), the data acquisition unit 1201 changes the process ID to P1 (step S109). On the other hand, when the data acquisition unit 1201 determines that the process ID of one record before is not P2 (NO in step S108), the data acquisition unit 1201 executes step S110.

Next, the data acquisition unit 1201 determines whether the process ID is P2 (step S110). When the data acquisition unit 1201 determines that the process ID is P2 (YES in step S110), the data acquisition unit 1201 calculates a difference between a record and one record before for all columns other than the machining unit ID, the time point and the process ID, and adds the result to new columns (step S111). Referring to FIG. 4, the difference between a record and one record before is calculated for each of the voltage and the displacement amount, and the results are added as new columns of "voltage difference" and "displacement amount difference". On the other hand, when the data acquisition unit 1201 determines that the process ID of the one record before is not P2 (NO in step S110), the data acquisition unit 1201 executes step S112.

Figure 13:
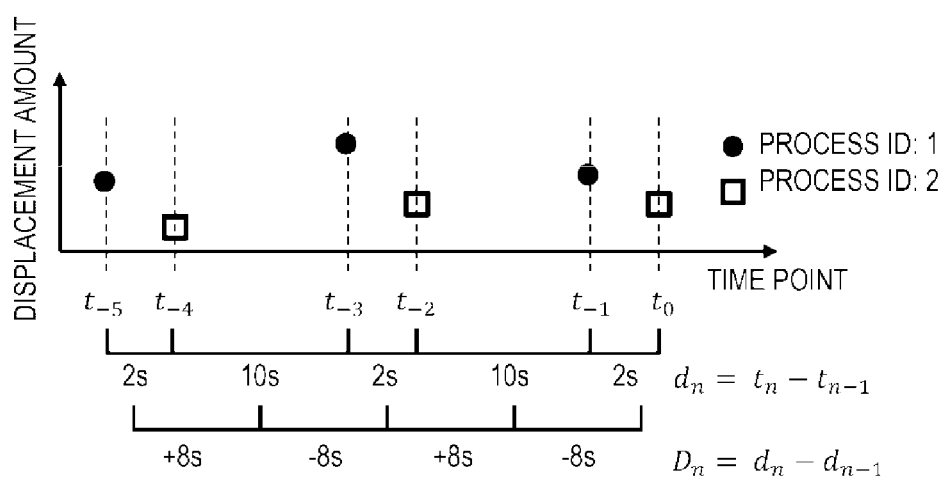
FIG. 13 is a diagram showing an example of a procedure of determining a process ID of facility data in the data acquisition processing performed by the countermeasure recommendation device according to the first embodiment.

FIG. 13 is a diagram showing an example of a procedure of determining the process ID of the facility data in the data acquisition processing operation S100 performed by the countermeasure recommendation device 100 according to the first embodiment.

In the graph shown in FIG. 13, a horizontal axis represents the time point and a vertical axis represents the displacement amount. Data with a process ID of 1 is represented by a black circle, and data with a process ID of 2 is represented by a white rectangle. At a stage where the facility data is acquired from the data collection unit 240 in step S103, the process ID of each data is unknown.

The data acquisition unit 1201 calculates $d_n$ in step S104 and $D_n$ in step S105, and determines the process ID in step S106 based on the required time of each process acquired from the facility setting data 1425.

Based on the facility setting data 1425 shown in FIG. 8, in the example of FIG. 13, $d_n$ is 2 s (seconds) or 10 s, and $D_n$ is +8 s or −8 s. According to the facility setting data 1425 shown in FIG. 8, processes of both the process ID P1 and the process ID P2 have a required time of 2 s, and the process of a process ID P0 for product switching before the P1 needs a time of 8 s.

In the present embodiment, the control unit 220 of the facility 200 controls the machining unit 250 to execute P0, P1, and P2 in this order. When the control is interrupted in the middle of the process due to the defect occurrence, the control unit 220 controls the machining unit 250 to execute from P0 again after restart.

Accordingly, it can be determined that the process ID of the facility data in which $d_n$ is 2 s or $D_n$ is of −8 s is P2, and otherwise, the process ID of the facility data is P1. Therefore, the data acquisition unit 1201 records the process ID based on this condition.

Since the control unit 220 controls the machining unit 250 in the above procedure, there is no case where the control unit 220 continuously executes the P2. Therefore, when there is a record erroneously recording that P2 is continuously executed, the data acquisition unit 1201 corrects the record according to the processing of steps S108 and S109.

Figure 14:
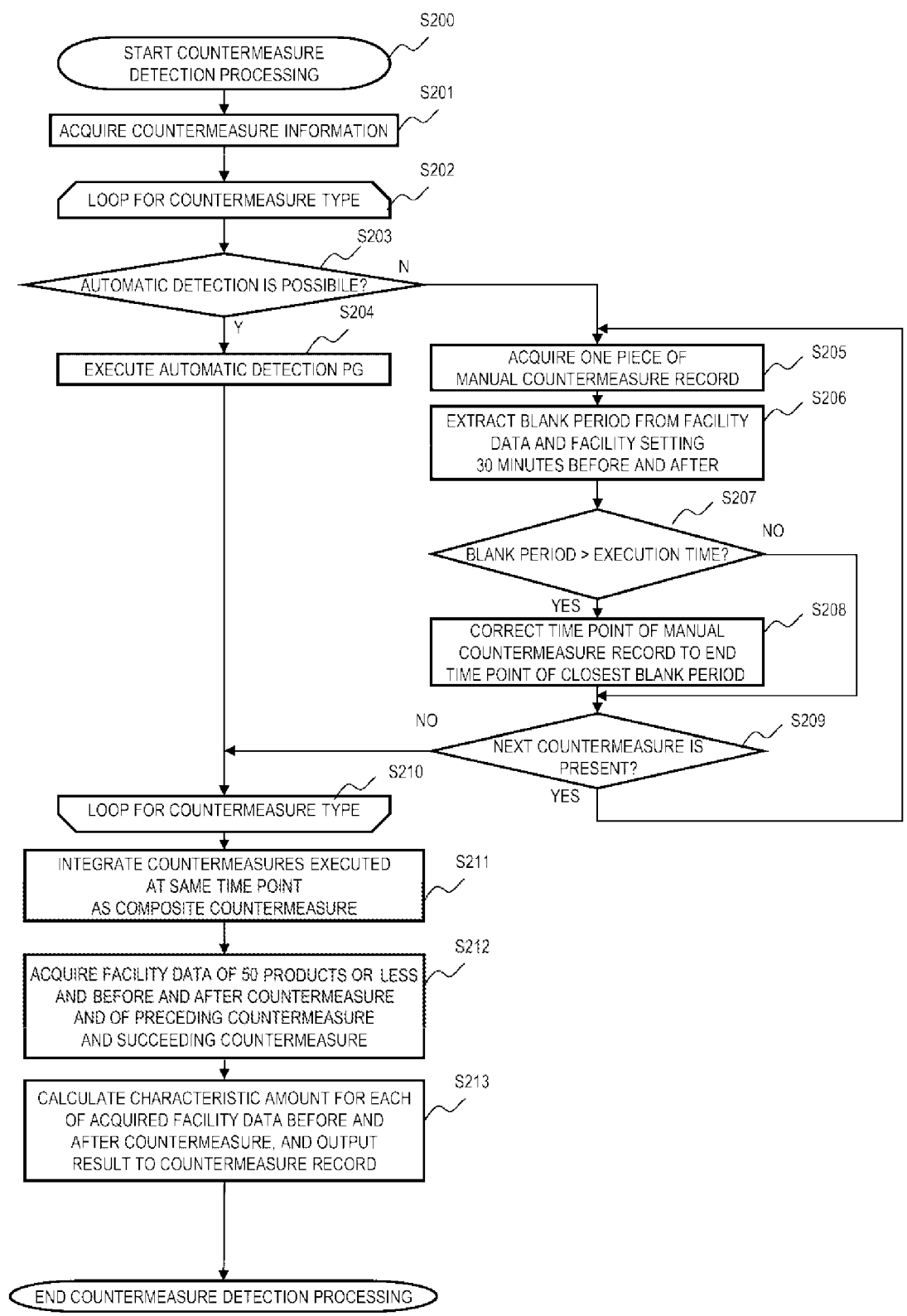
FIG. 14 is a flowchart showing a countermeasure detection processing performed by the countermeasure recommendation device according to the first embodiment.

FIG. 14 is a flowchart showing the countermeasure detection processing operation S200 performed by the countermeasure recommendation device 100 according to the first embodiment.

First, the countermeasure detection unit 1202 acquires the countermeasure information data 1426 from the database 141 (step S201).

Next, the countermeasure detection unit 1202 repeatedly executes the processing of steps S202 to S210 for the countermeasure type of the countermeasure information data 1426 (step S202).

Next, the countermeasure detection unit 1202 determines whether the automatic detection possibility of the countermeasure information data 1426 is "Y" or "N" (step S203). When it is determined that the automatic detection possibility is "Y" (YES in step S203), the countermeasure detection unit 1202 executes an automatic detection program which is present in a path described in the automatic detection program of the countermeasure information data 1426 (step S204), and executes the next repeated processing (step S210).

On the other hand, when it is determined that the automatic detection possibility is "N" (NO in step S203), the countermeasure detection unit 1202 acquires one piece of the manual countermeasure record data 1422 (step S205).

Next, the countermeasure detection unit 1202 acquires the facility data 1421 and the facility setting data 1425 30 minutes before and after the time point of the manual countermeasure record data 1422, and extracts, as a blank period, a period during which the facility data 1421 has no value larger than a maximum value of the required time of the process stored in the facility setting data 1425 (step S206).

Next, the countermeasure detection unit 1202 determines whether the blank period longer than an execution time of the countermeasure information data 1426 is present (step S207). When it is determined that the blank period is present (YES in step S207), the countermeasure detection unit 1202 corrects the time point of the manual countermeasure record data 1422 to an end time point of the closest blank period (step S208). On the other hand, when it is determined that the blank period is not present (NO in step S207), the countermeasure detection unit 1202 executes step S209.

Next, the countermeasure detection unit 1202 determines whether the next countermeasure record is present in the manual countermeasure record data 1422 (step S209). When it is determined that the next countermeasure record is present (YES in step S209), the countermeasure detection unit 1202 executes step S205 again. On the other hand, when it is determined that the next countermeasure record is not present (NO in step S209), the countermeasure detection unit 1202 executes step S210.

After the repeated processing is executed for all the countermeasure types, the countermeasure detection unit 1202 integrates the countermeasures executed at the same time point as a composite countermeasure (step S211). For example, when the countermeasure detection unit 1202 detects the "voltage change" and the "electrode replacement" as countermeasures executed at the same time point, the countermeasure detection unit 1202 integrates the two countermeasures, and that the countermeasure type of "electrode replacement+voltage change" is executed.

Next, the countermeasure detection unit 1202 acquires the facility data 1421 of 50 products or less and before and after the countermeasure and of a preceding countermeasure and a succeeding countermeasure (step S212).

Next, the countermeasure detection unit 1202 calculates the characteristic amount for each of the acquired facility data 1421 before and after the countermeasure, and outputs the characteristic amount to the countermeasure record data 1423 (step S213).

Figure 15:
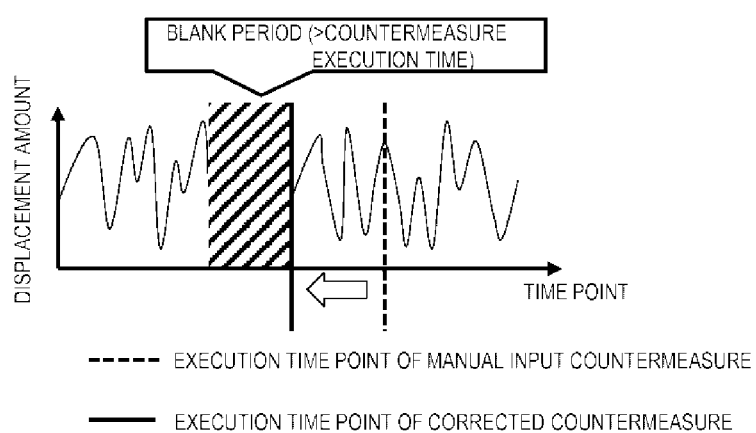
FIG. 15 is a diagram showing an example of a procedure of a correction processing of the manual countermeasure record data in the countermeasure detection processing performed by the countermeasure recommendation device according to the first embodiment.

FIG. 15 is a diagram showing an example of a procedure of a correction processing of the manual countermeasure record data in the countermeasure detection processing operation S200 performed by the countermeasure recommendation device 100 according to the first embodiment.

In the graph shown in FIG. 15, the horizontal axis represents the time point and the vertical axis represents the displacement amount. A dotted line represents an execution time point of manual input countermeasure acquired in step S205 in FIG. 14. A shaded portion represents the blank period extracted in step S206 of FIG. 14. A solid line represents an execution time point of the corrected countermeasure, which is a result of executing S208 when it is determined that, in step S207 of FIG. 14, the blank period is longer than the execution time of the manual input countermeasure.

Figure 16:
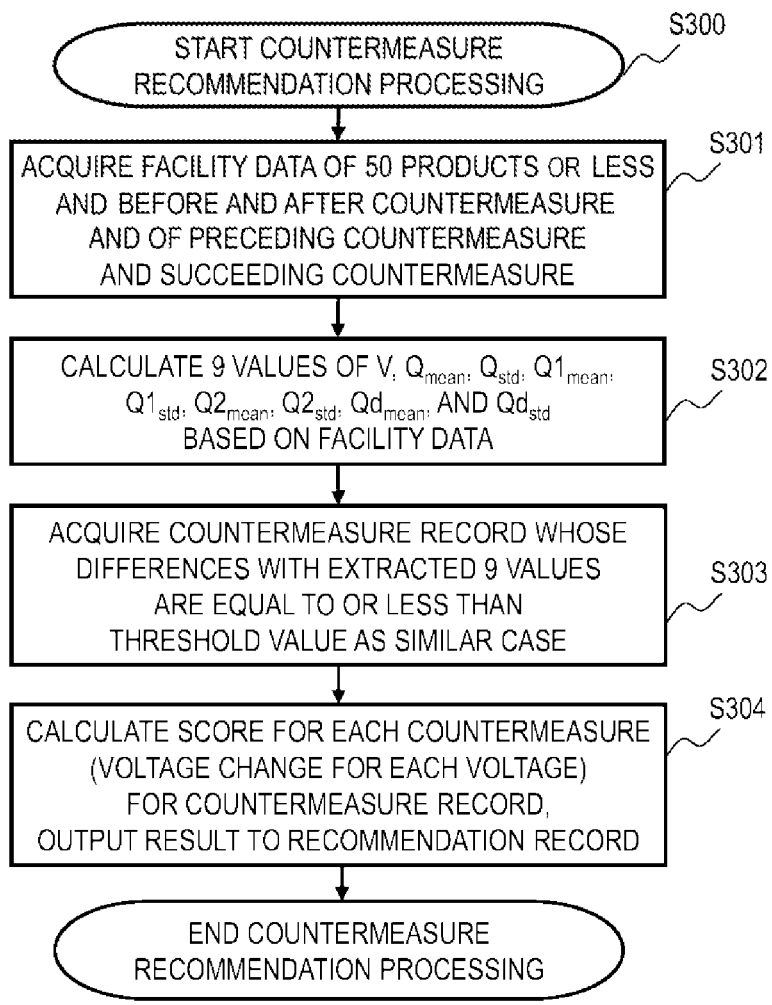
FIG. 16 is a flowchart showing a countermeasure recommendation processing performed by the countermeasure recommendation device according to the first embodiment.

FIG. 16 is a flowchart showing a countermeasure recommendation processing operation S300 performed by the countermeasure recommendation device 100 according to the first embodiment.

First, the countermeasure recommendation unit 1203 acquires, from the database 141, the facility data 1421 of 50 products or less and before and after the nearest products and of the preceding countermeasure and the succeeding countermeasure (step S301).

Next, the countermeasure recommendation unit 1203 calculates, based on the facility data 1421 acquired in step S301 and among the characteristic amount, 9 values of the mean voltage (V), a mean of the total displacement amount ($Q_{mean}$), a standard deviation of the total displacement amount ($Q_{std}$), a mean displacement amount of the process P1 ($Q1_{mean}$), a standard deviation of the displacement amount of the process P1 ($Q1_{std}$), a mean displacement amount of the process P2 ($Q2_{mean}$), a standard deviation of the displacement amount of the process P2 ($Q2_{std}$), a mean displacement amount difference between processes ($Qd_{mean}$), and a difference in standard deviation of the displacement amount between processes ($Qd_{std}$) (step S302).

Next, the countermeasure recommendation unit 1203 acquires, from the database 141, the countermeasure record data 1423 whose differences with the 9 values extracted in step S302 is equal to or less than threshold values as a similar case (step S303).

For example, among the extracted values, when the mean voltage is 3.0 and a threshold value of the mean voltage is 3.0±0.1, a case where the mean voltage in the countermeasure record is 2.9 to 3.1 is acquired. The same processing is executed for other values, and the case acquired for all values is set as the similar case. The threshold value may be appropriately set by the administrator or the user of the countermeasure recommendation device 100. Since an appropriate threshold value may be different for each value, the threshold value is set for each value.

Since the characteristic amounts before and after the countermeasure are stored in the countermeasure record data 1423, the characteristic amount before the countermeasure is acquired in step S303.

Next, the countermeasure recommendation unit 1203 calculates a score for each countermeasure for the countermeasure record data 1423 acquired in step S303, and outputs the machining unit ID, the time point at which a recommendation record is created, the countermeasure type, the score, the representative success case time point, the estimated process capability after countermeasure, and the recommendation view flag to the recommendation record data 1424 (step S304). In an example in which the recommendation record data 1424 of FIG. 7 is output, the score is a success rate calculated by "number of success cases/(number of success cases+number of failure cases)", and the number of success cases and the number of failure cases used for the score calculation are also output to the recommendation record data 1424. When step S304 is executed, the recommendation view flag always outputs "N".

Figure 17:
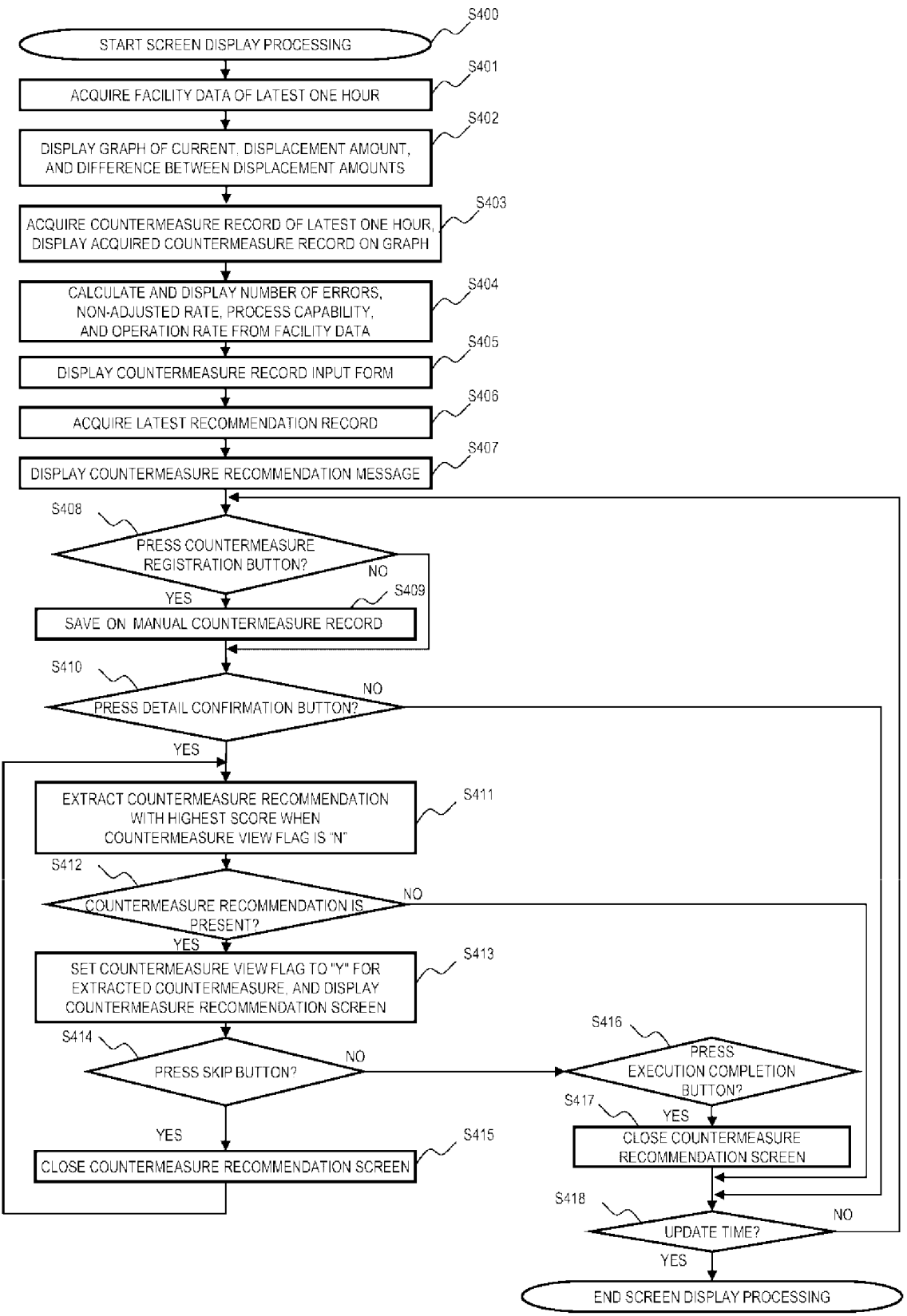
FIG. 17 is a flowchart showing a screen display processing performed by the countermeasure recommendation device according to the first embodiment.

FIG. 17 is a flowchart showing a screen display processing operation S400 performed by the countermeasure recommendation device 100 according to the first embodiment.

The following describes an example in which a screen created by the countermeasure presentation unit 1204 is output to a display screen of the input/output unit 110. However, the display screen of the input/output unit 110 may be viewed from an outside of the countermeasure recommendation device 100 via the communication unit 130 and the network 300.

First, the countermeasure presentation unit 1204 acquires the facility data 1421 of the latest one hour from the database 141 (step S401). However, a time range of the facility data 1421 to be acquired varies depending on a range to be displayed on the screen, and is not limited to the latest one hour.

Next, the countermeasure presentation unit 1204 displays a graph of the current, the displacement amount, and the difference between displacement amounts of the facility data 1421 (step S402). However, parameters displayed on the graph are not limited to the pressure, the thickness, the displacement amount, and the current.

Next, the countermeasure presentation unit 1204 acquires the countermeasure record data 1423 of the latest one hour from the database 141, and displays the countermeasure record data 1423 on the graph displayed in step S402 (step S403).

Next, the countermeasure presentation unit 1204 calculates and displays the number of errors, a non-adjusted rate, the process capability, and an operation rate as the information indicating a facility state from the facility data 1421 (step S404). However, the information indicating the facility state is not limited to the number of errors, the non-adjusted rate, the process capability, and the operation rate.

Next, the countermeasure presentation unit 1204 displays a countermeasure record input form (step S405).

Next, the countermeasure presentation unit 1204 acquires the latest recommendation record data 1424 from the database 141 (step S406). There are cases where the number of the latest recommendation record data 1424 is 0 or 0 or 2.

Next, the countermeasure presentation unit 1204 outputs a message corresponding to the recommendation record acquired in all steps to the screen (step S407). For example, when one or more countermeasure records are present, "Quality is degraded. Countermeasure is necessary." is displayed, and when no countermeasure is present, "none" is displayed.

Next, the countermeasure presentation unit 1204 determines whether a countermeasure registration button of the countermeasure record input form is pressed on the screen (step S408). When the countermeasure registration button is pressed, the countermeasure presentation unit 1204 stores the content recorded in the countermeasure record input form into the manual countermeasure record data 1422 of the database 141 (step S409).

Next, the countermeasure presentation unit 1204 determines whether a detail confirmation button of a message field is pressed on the screen (step S410). When the detail confirmation button is pressed, the countermeasure presentation unit 1204 extracts a countermeasure with the highest score when a countermeasure view flag is "N" among the recommendation records acquired in step S406 (step S411).

Next, the countermeasure presentation unit 1204 determines whether a countermeasure recommendation is present as a result of the previous step (step S412). When no countermeasure recommendation is present, the countermeasure presentation unit 1204 executes step S418. When the countermeasure recommendation is present, the countermeasure presentation unit 1204 sets the countermeasure view flag to "Y" for the extracted countermeasure, and displays a countermeasure recommendation screen in a pop-up manner (step S413).

Next, the countermeasure presentation unit 1204 determines whether a skip button of the countermeasure recommendation screen is pressed (step S414). When the skip button is pressed, the countermeasure presentation unit 1204 closes the pop-up of the countermeasure recommendation screen, and executes step S411 again (step S415).

When the skip button is pressed, the countermeasure presentation unit 1204 determines whether an execution completion button of the countermeasure recommendation screen is pressed (step S416). When the execution completion button is pressed, the countermeasure presentation unit 1204 closes the pop-up of the countermeasure recommendation screen (step S417).

Next, the countermeasure presentation unit 1204 determines whether an update time point is reached (step S418). When the update time point is reached, the countermeasure presentation unit 1204 ends the processing. When the update time point is not reached, the countermeasure presentation unit 1204 executes step S408 again.

Figure 18:
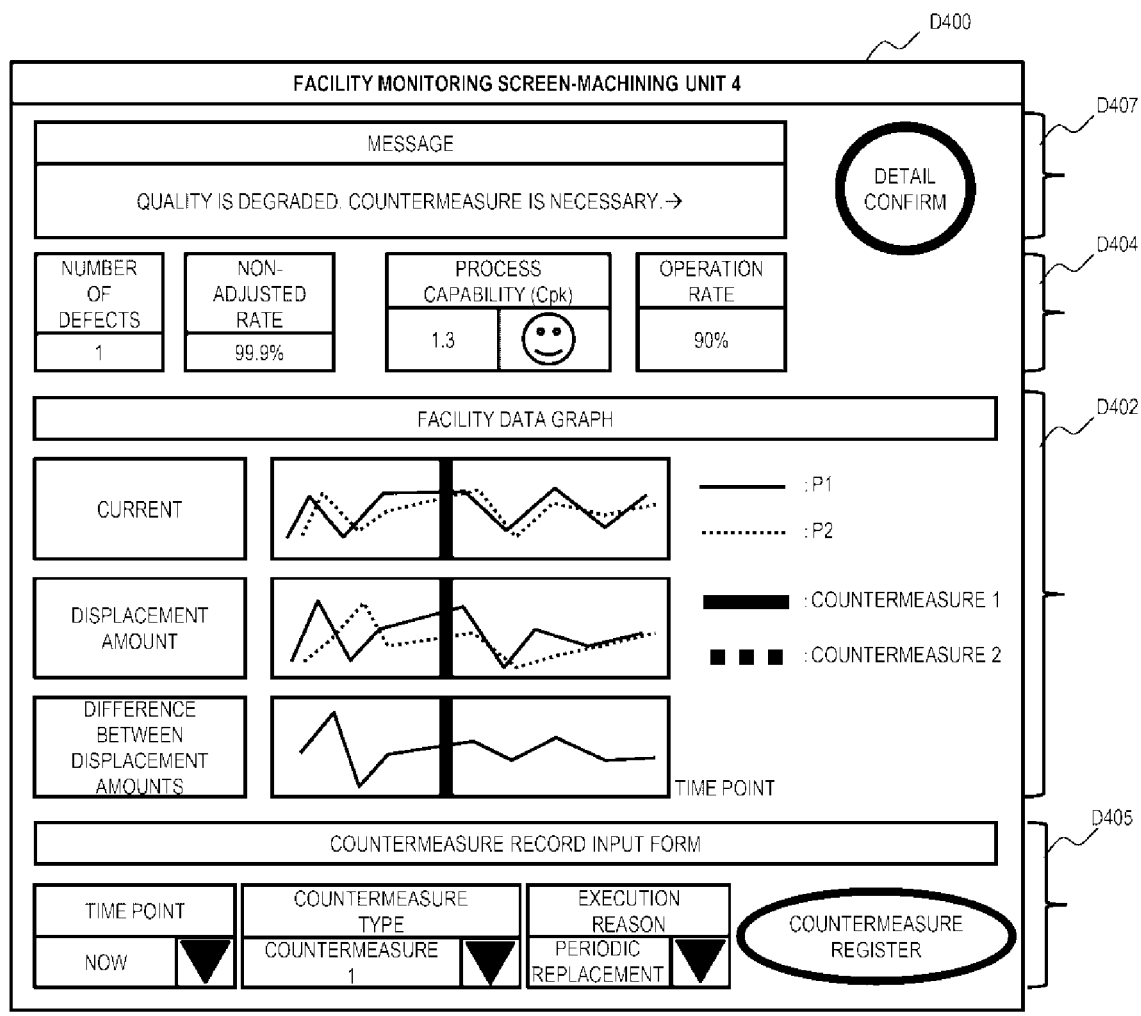
FIG. 18 is a diagram showing an example of a screen display in the screen display processing performed by the countermeasure recommendation device according to the first embodiment.

FIG. 18 is a diagram showing an example of a screen display in the screen display processing operation S400 performed by the countermeasure recommendation device 100 according to the first embodiment.

FIG. 18 shows an example of a screen of a facility display screen D400 for the machining unit 250. The facility display screen D400 includes a message display unit D407, a facility state display unit D404, a facility data display unit D402, and a countermeasure record input form D405.

The message display unit D407 includes a message content and a detail confirmation button, which are displayed in step S407. The pressing of the detail confirmation button is determined in step S408.

The facility state display unit D404 includes the number of defects, the non-adjusted rate, the process capability ($C_{pk}$), and the operation rate, which are displayed in step S404.

The facility data display unit D402 has a graph of the current, the displacement amount, and the difference between the displacement amounts, which are displayed in step S402. The graph of the current and the displacement amount is drawn by different types of lines for each process ID. In the example shown in FIG. 18, data of the process ID P1 is drawn by a solid line and data of P2 is drawn by a dotted line. Further, all execution time points of countermeasures are drawn on the graph. In the example shown in FIG. 18, a countermeasure 1 is drawn by the solid line and a countermeasure 2 is drawn by a dotted vertical line.

The countermeasure record input form D405 includes three pull-downs for inputting the time point, the countermeasure type and the execution reason, and the countermeasure registration button, and is displayed in step S405. The pull-down items correspond to the manual countermeasure record data 1422 of the database 141. The pressing of the countermeasure registration button is determined in step S408.

Figure 19A:
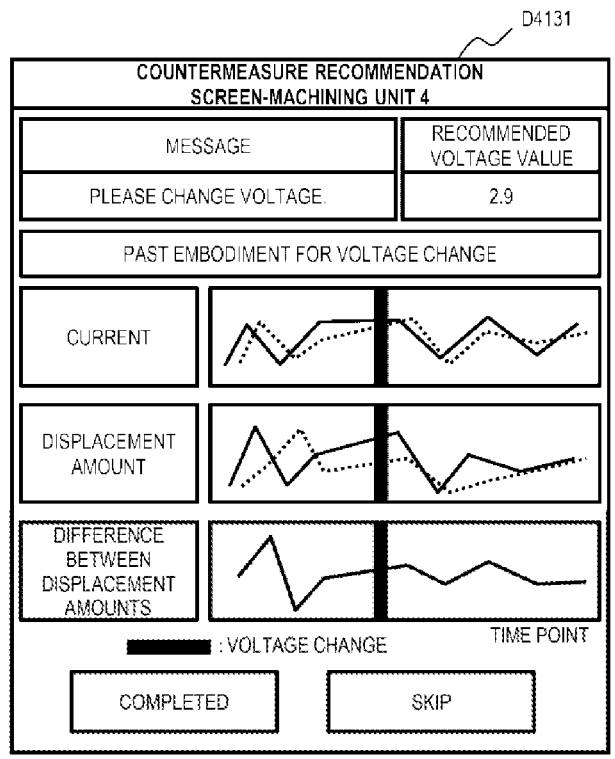
FIG. 19A is a diagram showing another example of the screen display in the screen display processing performed by the countermeasure recommendation device according to the first embodiment.

FIG. 19A is a diagram showing another example of the screen display in the screen display processing operation S400 performed by the countermeasure recommendation device 100 according to the first embodiment.

In FIG. 19A, a voltage change recommendation screen D4131 is shown as an example of the countermeasure recommendation screen for the machining unit 250.

The voltage change recommendation screen D4131 includes a message, a recommended voltage value, a past embodiment for voltage change, an end button, and a skip button.

In the example shown in FIG. 19A, in the past embodiment for voltage change, the current, the displacement amount, and the difference between the displacement amounts are acquired from the facility data 1421 of 50 products or less and before and after the countermeasure and of the preceding countermeasure and the succeeding countermeasure, and before and after the representative success case time point of the recommendation record data 1424, and a graph is created and displayed.

Figure 19B:
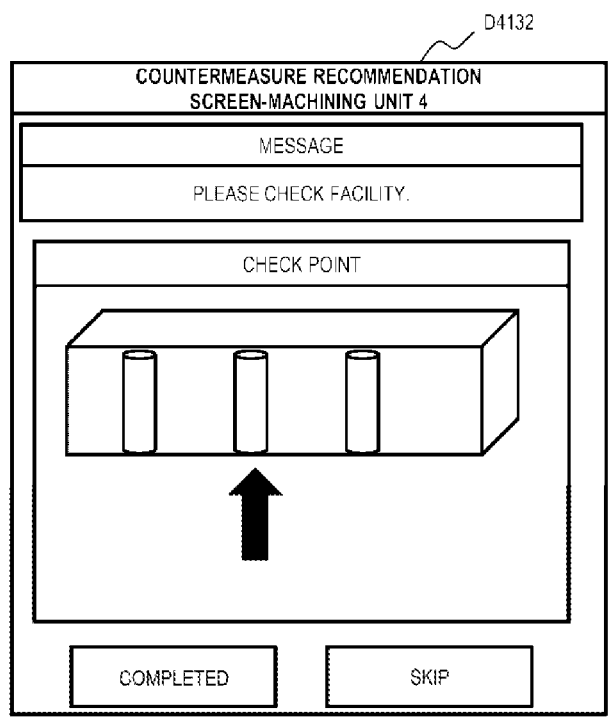
FIG. 19B is a diagram showing yet another example of the screen display in the screen display processing performed by the countermeasure recommendation device according to the first embodiment.

FIG. 19B is a diagram showing yet another example of the screen display in the screen display processing operation S400 performed by the countermeasure recommendation device 100 according to the first embodiment. FIG. 19B shows a facility check recommendation screen D4132 as an example of the countermeasure recommendation screen for the machining unit 250.

The facility check recommendation screen D4132 includes a message, a check point, an end button, and a skip button. The check point displays, for example, an image of a portion to be inspected by the operator, or displays a check point order.

Effect of Countermeasure Recommendation Device 100

According to the present embodiment configured as described above, the data acquisition unit 1201 assigns a label for each process of the facility data 1421 collected from the facility 200 based on the facility setting data 1425.

Therefore, according to the present embodiment, even when the countermeasure recommendation device 100 collects the facility data 1421 of the same format even for different processes, the administrator or the user of the countermeasure recommendation device 100 can examine the facility data 1421 in a process unit based on the facility data 1421 assigned with the label for each process. Accordingly, it is possible to provide a countermeasure recommendation device and a countermeasure recommendation method which can optimize the operation of the manufacturing facility by presenting a countermeasure for improving the quality, even in the manufacturing process where the product quality changes even under constant manufacturing conditions.

In the present embodiment, the countermeasure recommendation unit 1203 is configured to calculate the characteristic amount from a predetermined number of latest facility data 1421, extract the characteristic amount of the countermeasure record data 1423 within a predetermined threshold value for the calculated characteristic amount, and select the countermeasure related to the extracted characteristic amount. Therefore, it is possible for the countermeasure recommendation device 100 to select an accurate countermeasure, and based on the accurate countermeasure, it is possible to optimize the operation of the manufacturing facility by presenting a countermeasure for improving the quality.

Further, in the present embodiment, the countermeasure detection unit 1202 refers to the countermeasure record data 1423 based on the time point of the manual countermeasure record data 1422, corrects the time point of the manual countermeasure record data 1422 based on the time point of the countermeasure record data 1422, and records the corrected time point and the countermeasure type of the manual countermeasure record data 1422 into the countermeasure record data 1423. Accordingly, even when the time point of the manual countermeasure record data 1422 is inaccurate, this time point can be corrected to a more accurate time point. Accordingly, the reliability of the countermeasure record data 1423 can be further improved, and thus the countermeasure selection performed by the countermeasure recommendation unit 1203 can be made more accurate.

Further, in the present embodiment, since the data acquisition unit 1201 creates additional facility data based on the facility data 1421 for each process, the administrator or the user of the countermeasure recommendation device 100 can easily grasp the displacement amount of the facility data 1421 between processes. Accordingly, it is possible to easily grasp which process causes the quality degradation by the administrator or the user of the countermeasure recommendation device 100.

Second Embodiment

In the countermeasure recommendation device 100 according to the first embodiment, the countermeasure recommendation unit 1203 executes the countermeasure recommendation processing operation S300 using a success rate of the countermeasure or an estimated process capability after the countermeasure as a score. However, these scores are rarely executed in practice, but it is possible to prioritize and recommend a countermeasure which has a large countermeasure effect but have a large countermeasure execution cost.

In a second embodiment, the score is calculated based on both the countermeasure effect and the countermeasure execution cost. That is, in the present embodiment, the score is a value indicating a cost with respect to an effect of the countermeasure. Therefore, the countermeasure record data 1423 which is the output of the countermeasure recommendation processing operation S300 is as follows.

FIG. 20 is a diagram showing an example of the recommendation record data 1424 according to the second embodiment. In the following description, the same components as those in the first embodiment are denoted by the same reference numerals, and the description thereof is simplified.

In the recommendation record data 1424, the machining unit ID, the time point, the countermeasure type, the number of success cases, the number of failure cases, the success rate, the estimated process capability after countermeasure, an effect the countermeasure (yen), an execution cost of countermeasure (yen), the score, the representative success case time point and the recommendation view flag are stored.

The effect is calculated by "(defective rate before countermeasure−estimated defective rate after countermeasure)× estimated number of productions up to next countermeasure×financial loss per defective product". The defective rate before countermeasure and the estimated defective rate after countermeasure are calculated using the quality information data 1427 from the process capability before countermeasure calculated based on the facility data 1421 and the estimated process capability after countermeasure of the recommendation record data 1424.

The execution cost is the cost required to execute the countermeasure, and is, for example, the sum of the cost of the financial loss due to the occurrence of temporary stop of the facility and the cost of replaced components.

In the second embodiment, the score is a value indicating the cost-effect calculated by the "success rate×effect−execution cost".

Therefore, according to the present embodiment, since the countermeasure recommendation unit 1203 selects a countermeasure with a high cost-effect, it is possible for the countermeasure recommendation device 100 to select a more accurate countermeasure, and based on the accurate countermeasure, it is possible to further optimize the operation of the manufacturing facility by presenting a countermeasure to improve the quality.

Third Embodiment

In the countermeasure recommendation device 100 according to the first embodiment and the second embodiment, the machining unit 250 executes machining including two processes. In a third embodiment described below, a case will be described where the machining unit 250 executes machining including three or more processes.

Figure 21:
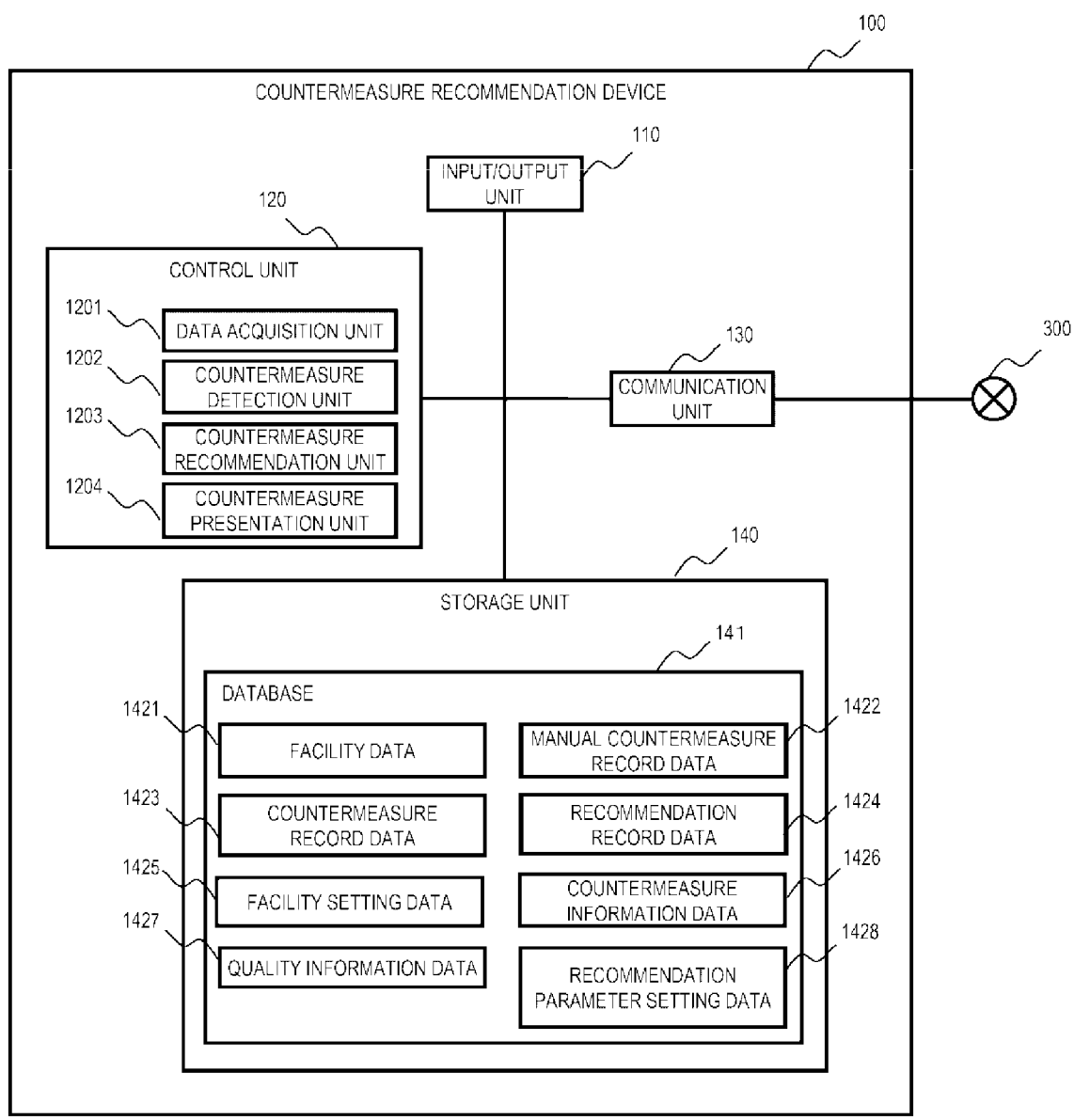
FIG. 21 is a block diagram showing a countermeasure recommendation device according to a third embodiment.

FIG. 21 is a block diagram showing the countermeasure recommendation device 100 according to the third embodiment. The configuration of the countermeasure recommendation device 100 according to the third embodiment shown in FIG. 21 is substantially the same as the configuration of the countermeasure recommendation device 100 according to the first embodiment, but a recommendation parameter setting data 1428 is stored in the database 141 of the storage unit 140 according to the third embodiment. The content of the recommendation parameter setting data 1428 will be described later.

FIG. 22 is a diagram showing an example of the facility data 1421 according to the third embodiment.

In the facility data 1421, the machining unit ID, the time point, the voltage, the displacement amount, and the characteristic amount label are stored.

In the facility data 1421 according to the first embodiment shown in FIG. 4, a case is shown as an example in which data such as the voltage and the displacement amount can be acquired from the facility 200, but data stored in the facility data 1421 by the data acquisition unit 1201 of the countermeasure recommendation device 100 is not limited to the voltage and the displacement amount.

In the example shown in FIG. 22, the characteristic amount label is added to and stored in the facility data 1421 shown in FIG. 4. "P1", "P2", and "P3" represent records in which values of the processes are stored. "P1−P2", "P2−P3", and "Std (P1, P2, P3)" represent records in which the characteristic amounts calculated based on the values of respective processes are stored, and represent "difference between P1 and P2", "difference between P2 and P3", and "standard deviation of P1, P2, P3" respectively.

FIG. 23 is a diagram showing an example of the facility setting data 1425 according to the third embodiment.

In the facility setting data 1425, the machining unit ID, the process ID, the required time of each process, and the characteristic amount label are stored. The characteristic amount label represents a characteristic amount to be created after process detection in the data acquisition processing operation S100 shown in FIG. 25 to be described later.

FIG. 24 is a diagram showing an example of the recommendation parameter setting data 1428 according to the third embodiment.

In the recommendation parameter setting data 1428, the machining unit ID, the process ID, the parameter name, the characteristic amount label, and a calculation method are stored. The calculation method represents a method of calculating a plurality of records in the process.

Figure 25:
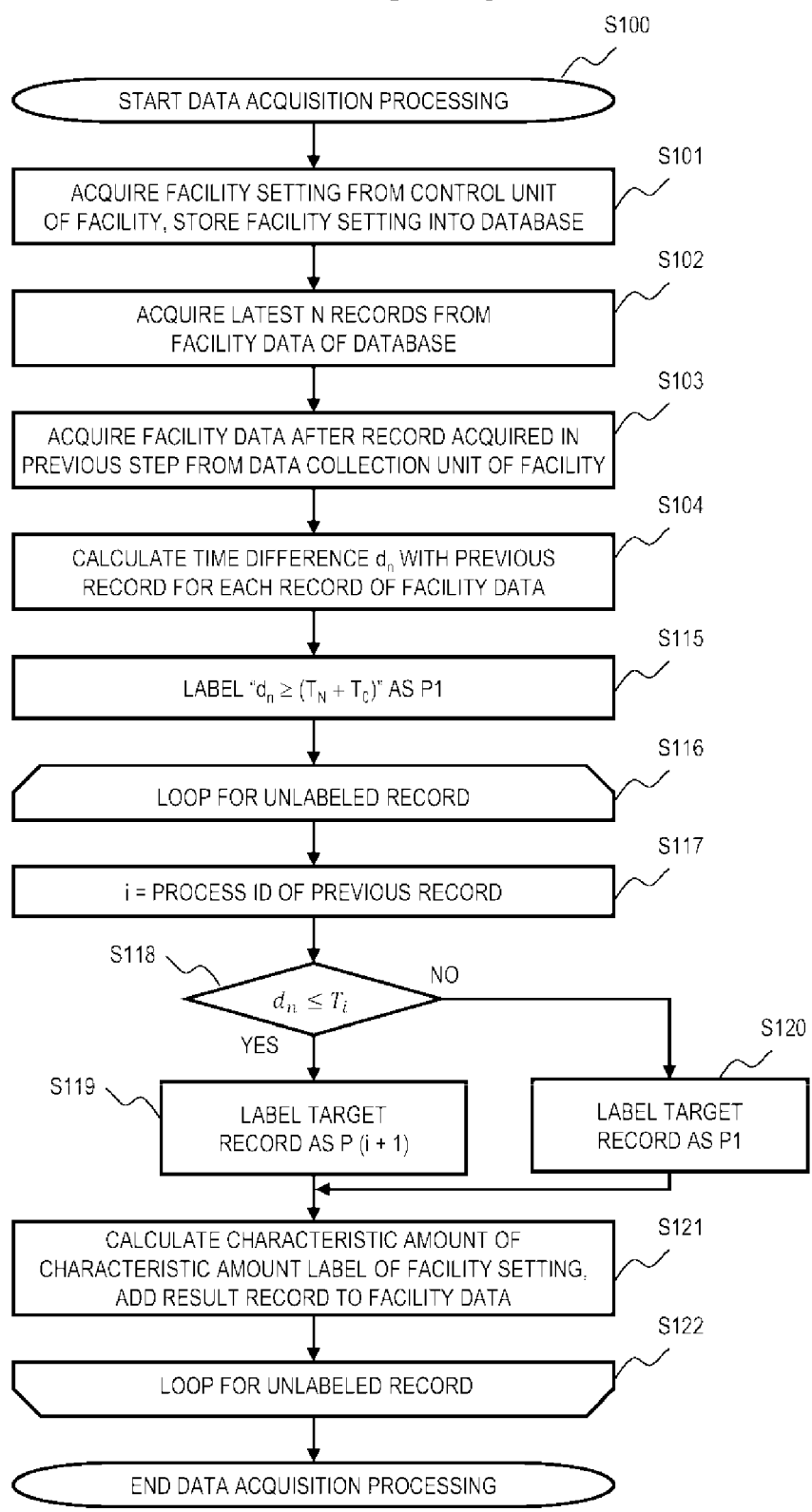
FIG. 25 is a flowchart showing a data acquisition processing performed by the countermeasure recommendation device according to the third embodiment.

FIG. 25 is a flowchart showing the data acquisition processing operation S100 performed by the countermeasure recommendation device 100 according to the third embodiment.

First, the data acquisition unit 1201 executes processing similar to the processing shown in FIG. 12 with respect to steps S101 to S104. However, the number of records acquired in step S102 is set to be the number of processes N of the facility setting data 1425.

Next, when $d_n$ is set as a time difference, $T_N$ is set as the required time of process N, and $T_0$ is set as the required time of process 0 which is product transportation as $T_0$, the data acquisition unit 1201 labels a record satisfying "$d_n \geq (T_N + T_0)$" as P1 (step S115).

Next, the data acquisition unit 1201 repeatedly executes the processing of steps S116 to S122 for an unlabeled record (step S116).

First, the data acquisition unit 1201 substitutes the process ID of a previous record into a variable i (step S117).

Next, the data acquisition unit 1201 determines whether the time difference $d_n$ is equal to or less than a required time $T_p$ of process p (step S118). When it is determined that $d_n$ is equal to or less than $T_p$ (YES in step S118), the data acquisition unit 1201 labels a target record as P (i+1) (step S119). On the other hand, when it is determined that $d_n$ is not equal to or less than $T_p$ (NO in step S118), the data acquisition unit 1201 labels the target record as P1 (step S120).

Next, the data acquisition unit 1201 searches for the characteristic amount described in the characteristic amount label of the facility setting data 1425, and adds a result record to the facility data 1421 (step S121).

Figure 26:
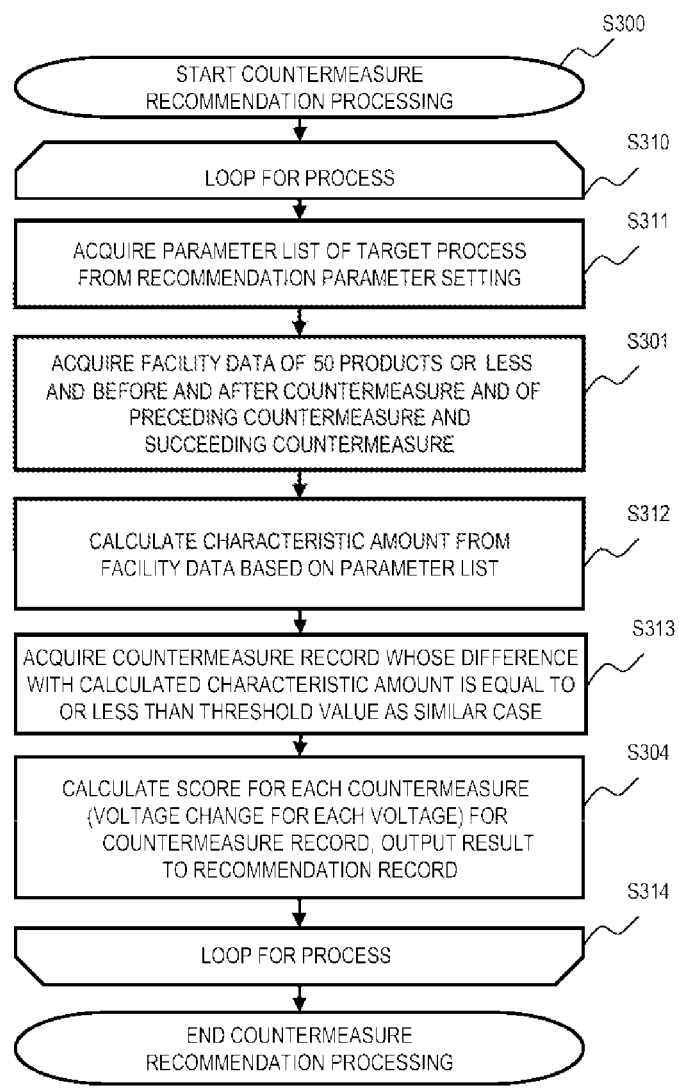
FIG. 26 is a flowchart showing a countermeasure recommendation processing performed by the countermeasure recommendation device according to the third embodiment.

FIG. 26 is a flowchart showing the countermeasure recommendation processing operation S300 performed by the countermeasure recommendation device 100 according to the third embodiment.

First, the countermeasure recommendation unit 1203 repeatedly executes the processing of steps S310 to S314 for the process (step S310).

That is, the countermeasure recommendation unit 1203 acquires a parameter list of target processes from the recommendation parameter setting data 1428 (step S311).

Next, the countermeasure recommendation unit 1203 executes the same processing as that in step S301 shown in FIG. 16.

Next, the countermeasure recommendation unit 1203 calculates a characteristic amount from the facility data 1421 based on the parameter list acquired in step S311 (step S312).

Next, the countermeasure recommendation unit 1203 acquires a countermeasure record whose difference with the calculated characteristic amount is equal to or less than a threshold value as a similar case (step S313).

Next, the countermeasure recommendation unit 1203 executes the same processing as that in step S304 shown in FIG. 16.

Therefore, according to the present embodiment, even when the machining unit 250 executes three or more processes, it is possible to provide a countermeasure recommendation device and a countermeasure recommendation method which can optimize the operation of a manufacturing facility by presenting a countermeasure to improve the quality.

Fourth Embodiment

The countermeasure recommendation device 100 according to the first embodiment, the second embodiment, and the third embodiment labels a process ID for each record based on the required time of the facility setting data 1425 for the facility data 1421 to be input. This labeling method assumes that the data collection unit 240 collects a single piece of facility data 1421 for one process.

However, depending on the facility, data including a plurality of records may be collected from one process. There is also a facility in which the process is not switched in a required time unit, but is switched under the condition of sensor data, such as a temperature and a rotation number.

The fourth embodiment shows an example in which facility data 1421 of a plurality of records can be collected from one process, and the facility data 1421 is labeled with a process ID under conditions other than the required time.

FIG. 27 is a diagram showing an example of the facility setting data 1425 according to the fourth embodiment. The facility setting data 1425 includes the machining unit ID, the process ID, a determination condition, the characteristic process, and the characteristic amount label.

The conditions to be satisfied by the facility data 1421 of each process are stored in the determination condition. For example, "Time <600" indicates that the time of the corresponding process is less than 600, and the "rotation speed >20" indicates that the rotation number of the corresponding process is larger than 20.

In the characteristic process stores, in facility data 1421 which includes repeated process, information related to whether the process can be labeled with the process ID without depending on a preceding process and a succeeding process. The process with a characteristic process of "Y" is present for each machining unit and is firstly labeled. In the example of the third embodiment shown in FIG. 24, although P1 is labeled in step S115, in the fourth embodiment, the characteristic process detects process of "Y" at this stage and labels the process of "Y".

In FIG. 27, the characteristic amount label calculated after the labeling of all process IDs is stored in a record in which no data is present in the process ID.

Therefore, according to the present embodiment, even when the facility data 1421 of a plurality of records can be collected from one process, a label for each process can be appropriately assigned to the facility data 1421.

Modification

The invention is not limited to the embodiments described above, and includes various modifications. For example, the embodiments described above have been described in detail for easy understanding of the invention, and the invention is not necessarily limited to those including all the configurations described above. A part of the configuration of one embodiment can be replaced with the configuration of another embodiment, and the configuration of another embodiment can be added to the configuration of one embodiment. With respect to a part of the configuration of each embodiment, it is possible to add, delete, and replace other configurations.

Some or all of the above configurations, functions, machining units, processing options, and the like may be realized by hardware, for example, by designing an integrated circuit. The configurations, functions, and the like described above may be realized by software by a processor interpreting and executing a program for realizing the respective functions. Information such as a program, a table, and a file for realizing each function can be placed in a memory, a storage device such as a hard disk or an SSD, or a storage medium such as an IC card, an SD card, or a DVD.

The control lines and the information lines indicate what is considered necessary for the description, and not all the control lines and the information lines in the product are necessarily shown. Actually, almost all of the configurations may be considered to be mutually connected.

What is claimed is:

1. A countermeasure recommendation device, comprising:
   a data acquisition unit configured to collect a plurality of pieces of facility data from a manufacturing facility, and assign a label to each piece of the facility data based on facility setting data, wherein each assigned label identifies a facility process, and wherein the facility setting data includes a required time for completion of the facility process;
   a countermeasure detection unit configured to, based on the facility data, create countermeasure record data including a type of a countermeasure performed on the manufacturing facility, a characteristic amount indicating an effect of the countermeasure, a time point at which the countermeasure is performed, and a countermeasure execution time, wherein the countermeasure detection unit is further configured to:
      acquire the facility data for a duration starting a predetermined amount of time before the time point and ending a predetermined amount of time after the time point,
      extract a blank period from the acquired facility data, wherein the blank period is a period in which the facility data has no value larger than a maximum value of the required time of the facility process,
      correct the time point of the countermeasure record data based to an end point of the extracted blank period;
   a countermeasure recommendation unit configured to calculate the characteristic amount from a predetermined number of latest facility data, extract the characteristic amount of the countermeasure record data similar to the calculated characteristic amount, and select the countermeasure related to the extracted characteristic amount; and
   a countermeasure presentation unit configured to present the countermeasure selected by the countermeasure recommendation unit in a visualized state.

2. The countermeasure recommendation device according to claim 1, wherein the countermeasure recommendation unit extracts the characteristic amount of the countermeasure record data having a value in a predetermined range with respect to a value of the characteristic amount calculated based on the facility data.

3. The countermeasure recommendation device according to claim 2, wherein the countermeasure recommendation unit temporarily selects a plurality of the countermeasures, and selects one of the temporarily selected countermeasures based on a predetermined criterion.

4. The countermeasure recommendation device according to claim 1, wherein the countermeasure recommendation unit temporarily selects a plurality of the countermeasures, and selects one of the temporarily selected countermeasures based on a predetermined criterion.

5. The countermeasure recommendation device according to claim 4, wherein the countermeasure recommendation unit calculates a score for each of the temporarily selected plurality of the countermeasures, and selects a countermeasure having a highest score.

6. The countermeasure recommendation device according to claim 5, wherein the score is a success rate of the countermeasure.

7. The countermeasure recommendation device according to claim 5, wherein the score is a value indicating a cost-effect of the countermeasure.

8. The countermeasure recommendation device according to claim 1, further comprising:
   an input unit configured to receive manual countermeasure record data including a type of the countermeasure and a time point at which the countermeasure is performed.

9. The countermeasure recommendation device according to claim 8, wherein the countermeasure detection unit refers to the countermeasure record data based on the time point of the manual countermeasure record data, corrects the time point of the manual countermeasure record data based on the time point of the countermeasure record data, and records the corrected time point and the type of the countermeasure of the manual countermeasure record data into the countermeasure record data.

10. The countermeasure recommendation device according to claim 9, wherein the countermeasure detection unit refers to the facility setting data, calculates the characteristic amount corresponding to the type of the countermeasure of the manual countermeasure record data, and records the characteristic amount into the countermeasure record data.

11. The countermeasure recommendation device according to claim 1, wherein when there is a plurality of the countermeasures at the same time point, the countermeasure detection unit summarizes the countermeasures as a single composite countermeasure.

12. The countermeasure recommendation device according to claim 1, wherein the data acquisition unit creates additional facility data from the facility data for each facility process.

13. The countermeasure recommendation device according to claim 12, wherein the additional facility data is a difference in the facility data between the facility processes.

14. The countermeasure recommendation device according to claim 12, wherein the additional facility data is created according to the facility setting data.

15. A countermeasure recommendation method executed by a countermeasure recommendation device, comprising:
   collecting a plurality of pieces of facility data from a manufacturing facility, and assigning a label for each facility process to each piece of the facility data based on facility setting data, wherein each assigned label identifies a facility process, and wherein the facility setting data includes a required time for completion of the facility process;
   based on the facility data, creating countermeasure record data including a type of a countermeasure performed on the manufacturing facility and a characteristic amount indicating an effect of the countermeasure a time point at which the countermeasure is performed, and a countermeasure execution time;

acquiring the facility data for a duration starting a predetermined amount of time before the time point and ending a predetermined amount of time after the time point, extracting a blank period from the acquired facility data, wherein the blank period is a period in which the facility data has no value larger than a maximum value of the required time of the facility process, correcting the time point of the countermeasure record data based to an end point of the extracted blank period;

calculating the characteristic amount based on a predetermined number of latest facility data, extracting the characteristic amount of the countermeasure record data similar to the calculated characteristic amount, and selecting the countermeasure related to the extracted characteristic amount; and presenting the selected countermeasure in a visualized state.

* * * * *